United States Patent
Messner et al.

(10) Patent No.: US 6,754,016 B2
(45) Date of Patent: Jun. 22, 2004

(54) FREQUENCY MODULATION PATTERN FOR DISK DRIVE ASSEMBLIES

(75) Inventors: William C. Messner, Pittsburgh, PA (US); Jian-Gang Zhu, Pittsburgh, PA (US); Xiangdong Lin, Eden Prairie, MN (US)

(73) Assignee: Carnegie Mellon University, Pittsburgh, PA (US)

(*) Notice: Subject to any disclaimer, the term of this patent is extended or adjusted under 35 U.S.C. 154(b) by 284 days.

(21) Appl. No.: 09/838,357

(22) Filed: Apr. 19, 2001

(65) Prior Publication Data

US 2002/0154432 A1 Oct. 24, 2002

(51) Int. Cl.[7] .......................... G11B 5/09; G11B 5/596
(52) U.S. Cl. ...................... 360/48; 360/46; 360/77.08
(58) Field of Search .................... 360/48, 46, 77.08

(56) References Cited

U.S. PATENT DOCUMENTS

| | | | |
|---|---|---|---|
| 5,365,586 A | 11/1994 | Indeck et al. | |
| 5,408,505 A | 4/1995 | Indeck et al. | |
| 5,428,683 A | 6/1995 | Indeck et al. | |
| 5,546,462 A | 8/1996 | Indeck et al. | |
| 5,587,654 A | 12/1996 | Indeck et al. | |
| 5,625,689 A | 4/1997 | Indeck et al. | |
| 5,626,941 A | * 5/1997 | Ouano | 428/141 |
| 5,740,244 A | 4/1998 | Indeck et al. | |
| 5,786,958 A | 7/1998 | Negishi et al. | |
| 5,815,333 A | * 9/1998 | Yamamoto et al. | 360/60 |
| 5,920,628 A | 7/1999 | Indeck et al. | |
| 5,959,794 A | 9/1999 | Indeck et al. | |
| 5,966,264 A | 10/1999 | Belser et al. | |
| 6,025,970 A | 2/2000 | Cheung | |
| 6,028,731 A | 2/2000 | Bond | |
| 6,034,835 A | 3/2000 | Serrano | |
| 6,072,669 A | 6/2000 | Indeck | |
| 6,078,445 A | 6/2000 | Serrano et al. | |
| 6,347,016 B1 | * 2/2002 | Ishida et al. | 360/17 |
| 6,452,990 B1 | * 9/2002 | Leis et al. | 375/361 |

OTHER PUBLICATIONS

Alexei H. Sacks (Ph.D. thesis), "Position Signal Generation in Magnetic Disk Drives," 1995, pp. 24–49.

Xiangdong Lin et al., "Investigation of Advanced Position Error Signal Patterns In Patterned Media," *Journal of Applied Physics*, vol. 87, No. 9, pp. 5117–5119, May 1, 2000.

Jian–Gang Zhu et al., "Recording, Noise, and Servo Characteristics of Patterned Thin Film Media," *IEEE Transactions on Magnetics*, vol. 36, No. 1, Jan., 2000.

* cited by examiner

Primary Examiner—David Hudspeth
Assistant Examiner—Glenda P. Rodriguez
(74) Attorney, Agent, or Firm—Kirkpatrick & Lockhart LLP

(57) ABSTRACT

The invention relates to control systems for data storage media. More particularly, the invention relates to a system, method and apparatus for forming various frequency modulation patterns on storage media for providing position error signals. The invention also relates to forming various frequency modulation patterns on storage media for providing position error signals having a continuously varying frequency that is proportional to the position of a read/write transducer head within a track defined on a storage medium. The invention also relates to providing a demodulated signal that is proportional to a continuously varying position error signal frequency and thus to the position of the read/write head within a track defined on a storage medium.

30 Claims, 22 Drawing Sheets

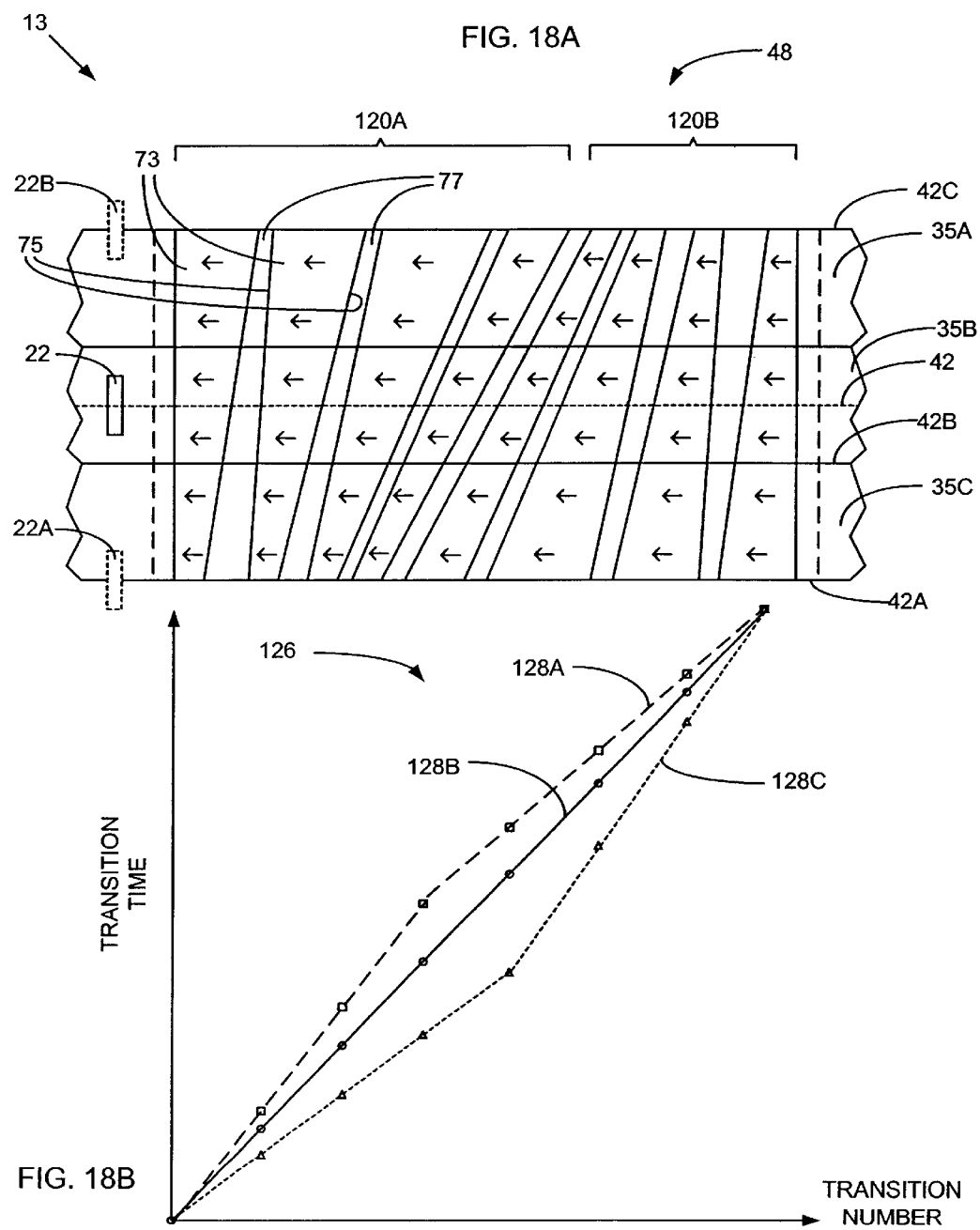

FREQUENCY MODULATION PATTERN FOR DISK DRIVE ASSEMBLIES

BACKGROUND

1. Technical Field

The invention relates generally to disk drive assemblies and, more particularly to frequency modulation read-back signal generation patterns for generating position error signals in accordance therewith for disk drive assemblies.

2. Description of Related Art

A magnetic disk drive assembly is a machine that is typically used to read data from and write data onto a magnetic disk. FIG. 1 illustrates a conventional magnetic disk drive assembly 32. The assembly 32 includes a storage medium 12 (e.g., a disk), an actuator 38, a head assembly 18 and a voice coil motor 40. The head assembly 18 is attached to the actuator 38 that is connected to the voice coil motor 40 (e.g., a servo motor). The voice coil motor 40 is used to move the head assembly 18 in order to keep it over a desired portion of the storage medium 12.

Information is recorded on the storage medium 12 in one or more tracks 34 and in one or more servo sectors 36. Typically, the tracks 34 store data, and for the disk drive assembly 32 to work properly, the head assembly 18 must lie within a small distance of the centerline of the track 34 being accessed. If the head assembly 18 deviates to either side of the center of the track, mistakes can occur in writing or reading information to and from the storage medium 12.

To determine the position of the head assembly 18 on the storage medium 12, special patterns are created on the storage medium 12 in one or more of the sectors 36. The head assembly 18 is used for reading the special patterns encoded on the sectors 36 of the storage medium 12 and for generating a signal that is indicative of the location of the head assembly 18 relative to the track 34 as well as the actual track number. This signal is called a position error signal (PES). Using a servo loop based on the PES, the voice coil motor 40 positions the head assembly 18 closer to the centerline of the track 34 being accessed. Accordingly, the sectors 36 are often referred to as "servo sectors."

FIG. 2 generally illustrates a disk drive system 10 including a storage medium 12 and a head assembly 18 for writing and reading information to and from the storage medium 12. The head assembly 18 includes a write head 20 for writing the information to the storage medium 12 and a read head 22 for reading information from the storage medium 12. As discussed hereinbefore, in order to maximize the accuracy with which the head assembly 18 writes and reads information to and from the storage medium 12, the position of the head assembly 18, and in particular the read head 22, should be controlled with the highest achievable accuracy in order to maximize storage density and accuracy of writing and reading data to and from the disk. The control information that is provided on the servo sectors 36 of the storage medium 12, as discussed hereinbefore, is dedicated for determining the position of the head assembly 18, the read head 22 or the write head 20.

The storage medium 12 typically is a magnetic disk comprising two layers: a magnetizable recording layer 14 and a substrate layer 16. Information is written or recorded on the storage medium 12 by magnetizing small regions within the recording layer 14 generally referred to as magnetic domains 28. As part of a write operation, as the storage medium 12 rotates in a given direction 30, the write head 20 is used to create the magnetic domains 28 on the recording layer 14, thereby creating a number of flux changes within the recording layer 14. In contrast, during a read operation, the read head 22 detects the magnetic domains 28. The total number of magnetic domains 28 that can be accommodated on a disk is indicative of the storage capacity or bit density of the storage medium 12.

The write head 20 is generally a thin film inductive head, which generally includes a coil 19 and a magnet 21 having a small gap 23. The magnet 21 is formed of a soft magnetic layer and the coil 19 is wrapped around one of the pole pieces of the magnet 21, such that when an electric current 24 is passed through the coil 19, a magnetic field 25 is created across the gap 23. The portion of the magnetic field 25 that fringes out from the gap 23 magnetizes the magnetizable recording layer 14 and thus creates the magnetic domains 28. The direction of the current 24 flowing through the coil 19 determines the polarity of each of the magnetic domains 28. Current flowing in one direction forms a magnetic domain 28 having a polarity representative of logic "one." Conversely, current 24 flowing in an opposite direction forms a magnetic domain 28 having an opposite polarity representative of logic "zero." The magnetic domains 28 form boundary regions when they are written in a contiguous pattern. The boundary regions are detected using the read head 22.

The read head 22 of the head assembly 18 generally senses the magnetic domains 28 created on the recording layer 14 of the storage medium 12 and produces an electrical signal in response thereto. In one example, the read head 22 can be a magneto resistive head, which operates on the principle of the magneto resistive effect or the giant magneto resistive effect. In its simplest form, a magneto resistive element undergoes a change in its internal resistance when it is aligned with the flux lines of a magnetic field. If a constant electrical current is provided as an input to a magneto resistive element, a change in its internal resistance will create a corresponding change in output voltage.

At the transition of the contiguous magnetic domains 28 there exist magnetic flux fields. When the read head 22 passes over a boundary region it senses the flux field present at the transition between two contiguous magnetic domains. The read head 22 responds to the magnetic flux by producing an output signal 26 (e.g., a read-back signal) corresponding to the encoded signal written to that portion of the storage medium 12. Accordingly, as the storage medium 12 moves relative to the read head 22, the read head 22 produces a series of output signals 26 representative of the information recorded on the storage medium 12. The disk drive system 10 therefore typically includes signal processing electronic circuits, such as a servo demodulator, a disk drive controller and a servo controller, for decoding the information.

FIG. 3 illustrates generally a conventional schematic representation of information encoded on a track 34 of a storage medium. As discussed previously, the track 34 may include a data portion 42 and a servo sector 36. As discussed previously, the servo sector 36 typically includes information encoded thereon, which is used to control the position of the read head 22 relative to the track 34. Those skilled in the art will appreciate that the information written to the servo sector 36 by the disk manufacturer must never be corrupted. Otherwise, it will be virtually impossible to determine the position of the read head 22 and, hence, it will be difficult to read the information stored on the storage medium 12.

The servo sector 36 typically includes a number of sub-portions, each including specially encoded patterns, which the read head 22 encounters in turn as it moves along the track 34. Generally the first special pattern in the servo sector 36 is a write recovery pattern 44. The second special pattern is a track identification pattern 46. The track identification pattern 46 merely provides information about which track 34 the read head 22 is located on, but does not provide information about the read head's 22 relative position within the track 34. Thus, the track identification pattern 46 alone is insufficient to determine the position of the read head 22 because the read head 22 is commonly somewhat narrower than the width of the track. Therefore, the read head 22 may be located outside of the optimum position while it is still within the correct track 34. The third special pattern is a servo burst pattern 48, which contains the information required to determine the exact position of the read head 22 within the track 34. The servo burst pattern 48 in a general sense is the subject of the present invention.

Finally, there are other special patterns 50 that contain information for calibration, automatic gain control (AGC) and the like. Automatic gain control can be used, for example, when the read head 22 flies closer than desired to the surface of the storage medium 12 and thereby generates relatively higher amplitude signals than if the read head 22 was flying at a normal distance away from the surface of the storage medium 12. Accordingly, the AGC electronically and automatically adjusts the read head 22 signal amplitude when the read head 22 is flying at a distance from the surface of the storage medium 12, which is other than a predetermined distance. Although the actual information written to the servo sector 36 can vary from manufacturer to manufacturer, the information provided in the servo sector 36 described herein is typical of what is included in a servo sector 36.

As discussed hereinbefore, the invention generally relates to the servo burst pattern 48 of the servo sector 36. The reason for encoding servo burst patterns 48 in the servo sector 36 of a storage medium 12 is to keep the head assembly 18 properly oriented relative to a track 34 of the storage medium 12 during a "write" or a "read" operation. In operation, because the position of the head assembly 18 must be continuously monitored and adjusted, the head assembly 18 can move out of alignment or drift as a result of many reasons. The most prevalent reason for moving out of alignment is due to vibration and shock of the disk drive assembly 32. For example, the storage medium 12 can be subjected to vibration resulting from bumping the disk drive system or operating it in a vibratory environment (e.g., on a plane or in a car). Also, in operation the storage medium 12 generally spins very fast, thereby creating air turbulence that tends to push the head assembly 18 out of alignment. All of these factors tend to cause the head assembly 18 to move out of alignment during a write or a read operation. It is therefore desirable to constantly monitor the position of the head assembly 18 and make the necessary adjustments to keep it centered within the current data track 34 as accurately as possible. Therefore, to properly control the position of the head assembly 18 and adjust it to a desired position, the location of the head assembly 18 relative to the storage medium and how far it has drifted from a desired location must be known.

Accordingly, information is encoded in the form of servo burst patterns 48 on the storage medium 12 to provide the disk drive assembly 32 control electronics with a position error signal (PES). The control electronics use the position error signal to adjust the position of the head assembly 18 to a desired predetermined position on the storage medium 12. Generally, the desired predetermined position of the head assembly 18 is along the center of a track 34.

Disk manufacturers typically set aside the servo sectors 36 on the storage medium 12 where the special patterns can be written. The special patterns provide a read-back signal, which is demodulated to produce the position error signal. A storage medium 12 typically includes fifty to two hundred servo sectors 36. The servo sectors 36 are generally separate from the data portions on the tracks 34 and occupy about 10–20% of the entire storage medium 12 surface area. Those skilled in the art will appreciate that the total amount of disk area that a manufacturer dedicates to servo sectors 36 is a compromise between the need for accuracy in determining the position the head assembly 18 and the need for maximizing the disk's storage capacity.

The process of writing the special patterns comprising the servo sectors 36 must generally be conducted under controlled conditions in order to keep the storage medium 12 from vibrating during the writing process. The special patterns are carefully written to the servo sectors 36 one track at a time. Generally, there is no data written in the data portions of the tracks 34 during this operation. The process of writing the special patterns to the servo sectors 36 takes a long time to complete, e.g., from several minutes up to one half hour per storage medium 12. As a result, writing servo patterns can be the single most time consuming phase of the disk drive assembly process, and for that reason it is a very costly process in terms of time and in terms of the equipment required to perform the writing operation. For example, the machine that is required to perform this operation is very expensive. Finally, the procedure is costly because it must be performed in a pristine environment such as inside a clean room where the disk drive is assembled. Furthermore, there are equipment maintenance costs to consider, and the equipment takes up valuable space in the clean room. Accordingly, there is a need in the disk drive manufacturing art for a servo pattern that can be written faster, more accurately and less expensively.

Disk drive manufacturers must be very precise about writing and encoding information to the storage medium 12. On the other hand, reading information from the disk can be done somewhat less precisely. This is true because the information can always be read over again or an algorithm can be executed to determine the accuracy of the information. If the read head 22 does not read the information properly, the disk drive system can merely wait until that portion of the storage medium 12 rotates around to read the information again. However, if the information is incorrectly written to the storage medium 12, permanent errors and mistakes will be encoded on the disk and errors in the operation of the disk drive system will result. Therefore, disk manufacturers must be very careful, and must precisely write and encode information to the storage medium 12.

Prior art special pattern types include amplitude patterns, null patterns, time-of-flight patterns and dual-frequency (1F/2F) patterns. In amplitude modulation patterns, the information is encoded in the amplitude of the PES signal. In addition, in a phase modulation pattern, the information is encoded in the phase of the PES signal. Various methods for encoding information on a storage medium 12 using amplitude modulation and phase modulation are well known. There also exist methods that utilize the relevant amplitudes of two discrete frequencies to encode information, e.g., the dual frequency (1F/2F) pattern. Related art servo burst patterns 48 generally make a trade-off between accuracy of position, storage density optimization, ease of manufacture, and the like. Following is a description of related art servo burst patterns provided within the servo sectors 36.

FIG. 4 illustrates a servo burst pattern 44, commonly referred to as a split-burst amplitude pattern, within the servo sector 48 of the storage medium 12. The storage medium 12 includes one or more tracks of which only three are shown 35A, 35B and 35C. The split-burst amplitude pattern 44 comprises two portions, a first portion 44A and a second portion 44B, and can be written to the servo sector 36 using the write head 20 of the head assembly 18, for example.

The ideal position for the read head 22 as it traverses one of the tracks 35A–C is typically along the central line of the track (line 42 of the track 35B, for example, as illustrated in FIG. 4). The width of the tracks 35A–C is generally greater than the width of the read head 22. In addition, the servo burst regions 44A and 44B are not positioned wholly within the track 35B, but rather they straddle the adjacent tracks 35A and 35C. The principle of operation of the split-burst pattern 44 is based on the relative magnitude of magnetic signal picked up by the read head 22 from the individual split burst patterns 44A and 44B. For example, one half of the split burst pattern 44A is positioned on track 35B and the other half is positioned on track 35A. Similarly, one half of the split burst pattern 44B is positioned on track 35B while the other half is positioned on track 35C. If the read head 22 is centered within the track 35B, it will detect an equal amount of magnetic flux from both burst patterns 44A and 44B. In other words, the read head 22 will detect an equal amount of signal amplitude from the first burst pattern 44A as it does from the other burst pattern 44B, resulting in zero difference seen by the read head 22.

As can be seen from the illustration, as the read head 22 drifts away from the line 42 (due to vibration, mechanical shock, etc.) it can move to a new position 22A, for example. (Throughout this description the position of the shifted read head 22 will be illustrated as 22A although it is always the same read head 22.) Once the read head 22A has drifted from its centered position along the track 35B, one end of the read head 22A will detect different amounts of magnetic flux from the first burst pattern 44A than it will detect from the second burst pattern 44B. For example, as the read head 22A shifts toward track 35A, it will detect a greater amount of magnetic flux from the 44A portion of the burst pattern than it will detect from the 44B portion of the burst pattern. Thus, the resulting output signal, which is a measure of the relative difference in magnitude of magnetic flux detected by the read head 22A as it passes over sequentially over burst patterns 44A and 44B, will be some value other than zero.

The disk drive controller monitors the amplitude of the signal detected by the read head 22 as it passes over the first burst pattern 44A and compares it to the amplitude of the signal detected when the read head 22 passes over the second burst pattern 44B. Accordingly, if the read head 22 is exactly in the center of the track 35B, then half of the read head 22 traverses the 44A portion and half of the read head 22 traverses the 44B portion of the servo burst pattern 44A–B. Accordingly, the detected signal amplitude will be fifty percent of maximum for the 44A portion, and likewise, as the read head 22 travels into the 44B portion, the detected signal amplitude will be half of the total signal and the amplitude will also be at fifty percent of maximum. The disk drive controller compares the difference between the two amplitudes. Accordingly, if signals of equal amplitude are detected from the 44A and 44B portions of the servo burst pattern 44, the total error signal generated by the disk drive controller will be zero. This indicates that the read head 22 is on center and no correction is required.

On the other hand, if the read head 22A were to be displaced toward track 35A, for example, it may detect 75 percent of the maximum signal amplitude from the first portion 44A of the burst pattern and 25 percent of the maximum signal amplitude from the 44B portion of the burst pattern. Accordingly, under the given scenario, the disk drive controller will generate a 50 percent position error signal. Likewise, if the read head 22A moves in the direction of track 35C by a similar amount, the disk drive controller will detect 25 percent of the signal amplitude from the first portion 44A of the burst pattern and 75 percent of the signal amplitude from the second portion 44B of the burst pattern. In this scenario, the disk drive controller will generate a position error signal of the same magnitude except having an opposite polarity. Once the disk drive controller decodes the position error signal, it provides a position error correction signal to the coil motor 40 in order to physically reposition the read head 22A to its centerline position 42. The split-burst pattern 44 is a commonly used pattern because it is the least expensive to make and can be easily made with current manufacturing techniques using write heads 22 having a rectangular geometry.

Another known servo pattern is the so-called "dual frequency 1F/2F pattern," illustrated in FIG. 5. The dual-frequency 1F/2F servo burst pattern 48A–B includes a first pattern 48A (1F), which generates a signal at a first frequency, and a second pattern 48B (2F), which generates a signal at a second, higher, frequency. The frequency of the signal produced by the second pattern 48B is generally double the frequency of the signal that is produced by the first pattern 48A.

As discussed above, one method of operating the disk drive assembly 32 is by positioning the read head 22 such that it traverses any of the tracks 35A–C along their centerline. Accordingly, if the read head 22 is traversing track 35B, it should be centered along the line 42 of the track 35B. As the read head 22 travels along the line 42, it simultaneously detects the super position of the signals generated by the 1F pattern 48A and the 2F pattern 48B. The disk drive controller then filters the super imposed signal comprising the 1F frequency component and the 2F frequency component and compares the relative amplitudes of the 1F signal component to the 2F signal component.

If the read head 22 is traversing the data track 35B along line 42, the disk drive controller detects equal values of amplitude (e.g., equal contributions from the signal at 1F as the signal at 2F) and produces an error correction signal of zero. However, if the read head 22A is displaced towards either track 35A or 35C, then the super imposed resulting signal will be different in that it will have more amplitude contribution from one of the two frequency signals and less amplitude contribution from the other. The disk drive controller will filter and detect the relative difference in amplitudes, and provide an error correction signal of the appropriate polarity to the coil motor 40.

Despite its usefulness, however, the dual-frequency 1F/2F servo burst pattern 48 has several shortcomings. First, it is somewhat more difficult to create this type of a pattern versus the split-burst servo pattern 44. Second, the read head 22 may respond in a different way to different frequencies. For example, the frequency response of the read head 22 at one frequency, e.g., one megahertz, may produce a signal of given amplitude. But, when the frequency is doubled, e.g., two megahertz, the frequency response of the read head 22 may produce a signal of different amplitude. To balance out the varying frequency response, both the read head 22 and the disk drive electronics will have to be calibrated, thus adding to the expense of this technique.

Because calibration can be difficult and because the 1F/2F servo burst patterns 48 can be somewhat more difficult to produce than the split-burst servo pattern 44, the dual-frequency 1F/2F servo burst pattern 48 is not as popular. Furthermore, a disadvantage common to both the split-burst servo pattern 44 and the dual-frequency 1F/2F servo burst pattern 48 is that each of these patterns works only on a single track width. As the track width narrows the format efficiency drops, making it tougher to write accurately defined patterns.

Another related art servo pattern used to generate position error signals is a phase pattern. Unlike the amplitude based servo burst patterns 44, 48 described above, the phase pattern is not limited to a single track, but rather crosses several tracks. The feature of being able to operate across several tracks is important because as track widths get narrower, it becomes harder to create well-defined servo patterns within a single track. Accordingly, the phase pattern increases the formatting efficiency and makes it easier in some ways to create larger servo patterns that provide sufficiently detailed information about the location of the read head within a particular track.

A typical phase servo pattern 54A–B is illustrated in FIG. 6. As shown in FIG. 6, the phase servo pattern 54A–B has a chevron shape that spans across several tracks 35A–C and includes two portions, a first portion 54A and a second portion 54B.

The operation of the phase servo pattern 54A–B is as follows. As the read head 22 moves along the line 42 of a track 35C (traversing the magnetic domain transitions 57 that form the chevron phase servo pattern 54A–B), a first read-back signal 62 having a first frequency is generated. A pulse in the first read-back signal 62 is generated at every magnetic domain transition 57 traversed by the read head 22 as it moves along the line 42 of the track 35C from left to right.

When the position of the read head 22A is displaced either up or down, a second read-back signal 64 is generated by the magnetic domain transitions 57. The second signal 64 will have the same frequency as the first read-back signal 62, but the pulses occur at a certain phase difference 66 that is proportional to how far the read head 22A has drifted away from the line 42. Accordingly, by measuring the phase difference 66 between the first and second read-back signals 62, 64, the disk drive controller can determine how much position error signal to generate in order to restore the position of the read head 22A to the centerline position of the track.

A problem with the chevron phase servo pattern 54A–B is that it is more difficult to create on a disk than the amplitude servo patterns 44, 48 discussed hereinbefore. The phase servo pattern 54A–B is difficult to create because the shape of the write head 20 used to produce the pattern on the disk is rectangular, thus making it difficult to produce the chevron shape 54A–B. The write head 20 is generally orthogonal to the line 42, whereas the chevron shape is ideally canted in relation to the line 42. It is also very time consuming because to obtain a uniform edge along the boundary of the chevron pattern 54A–B, the edges of the rectangular write head have to line up precisely. On the other hand, the amplitude servo burst patterns 44, 48 do not require that the edges line tip precisely as long as the amplitude of the output signal is correct.

In view of the drawbacks noted before for each of these servo pattern types, there exists a need in the disk drive art for an accurate servo pattern that is easier to encode and that spans several tracks on a storage medium. There is also a need for a servo pattern that is less noisy and that has a more linear response than existing patterns.

SUMMARY

According to one embodiment, the present invention is directed to a method of encoding a storage medium. The method includes forming a frequency modulation servo pattern on the storage medium. The frequency modulation servo pattern may be, for example, an absolute frequency modulation servo pattern or a differential frequency modulation servo pattern. According to one embodiment, forming the frequency modulation pattern may include forming a pattern comprising a plurality of multi-sided elements, each element having a first end and a second end, such that a distance between sides of adjacent elements are spaced farther apart at the first end than at the second end. Consequently, the pattern may provide a read-back signal having a continuously varying frequency according to the position of a read head relative to the storage medium.

According to another embodiment, the present invention is directed to a disk drive. The disk drive includes a storage medium including a frequency modulation servo pattern encoded thereon, a head for reading the frequency modulation servo pattern and for producing a read-back signal therefrom, a servo demodulator in communication with the head for receiving the read-back signal and producing a position error signal therefrom, and a servo coupled to the head for moving the head relative to the surface of the storage medium in response to the position error signal.

In contrast to prior disk drive servo techniques, the present invention provides a frequency modulation servo pattern that provides accurate position error data that is easy to encode on the storage medium. In addition, the servo pattern of the present invention may be encoded to span several tracks on the storage medium. Moreover, the servo pattern of the present invention may be less noisy and may have a more linear response than existing patterns. These and other inventions will be apparent from the detailed description hereinafter.

BRIEF DESCRIPTION OF THE DRAWINGS

The present invention will be described in conjunction with the following figures, wherein:

FIG. 18A illustrates one embodiment of a differential frequency modulation servo pattern according to the present invention;

FIG. 18B illustrates another embodiment of a differential frequency modulation servo pattern according to the present invention;

DETAILED DESCRIPTION

It is to be understood that the figures and descriptions of the present invention have been simplified to illustrate elements that are relevant for a clear understanding of the present invention, while eliminating, for purposes of clarity, other elements of a conventional disk drive assembly. For example, details of the voice coil motor are not provided herein. Those of ordinary skill in the art will recognize, however, that these and other elements may be desirable in a typical disk drive assembly. However, because such elements are well known in the art, and because they do not facilitate a better understanding of the present invention, a discussion of such elements is not provided herein.

Figure 1:
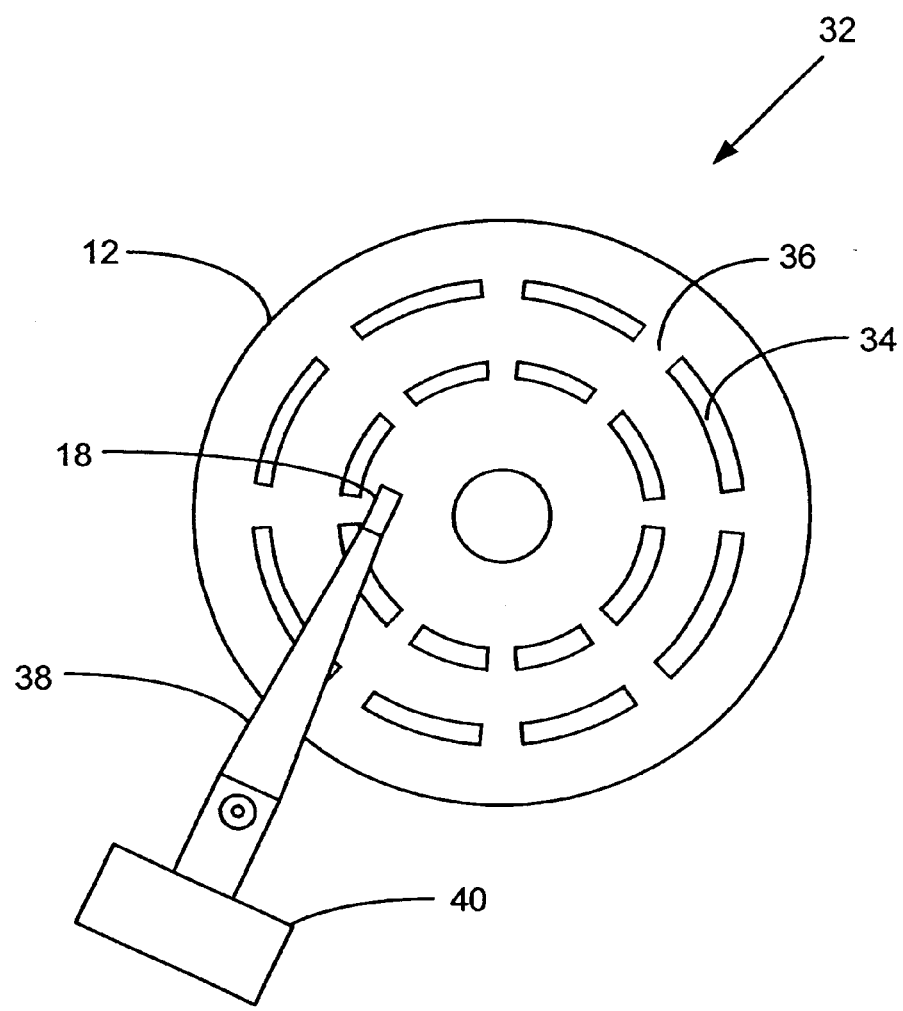
FIG. 1 illustrates a conventional related art magnetic disk drive assembly.
Figure 2:
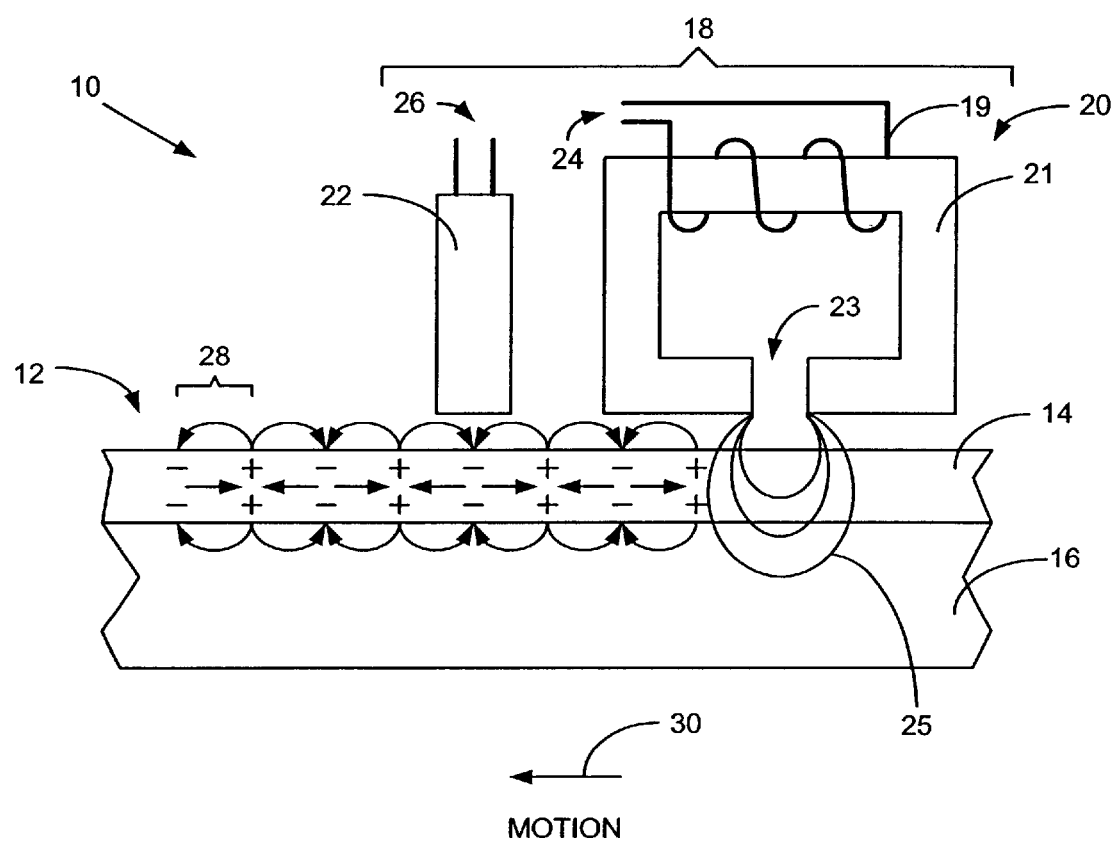
FIG. 2 illustrates a conventional related art read/write head assembly.
Figure 3:
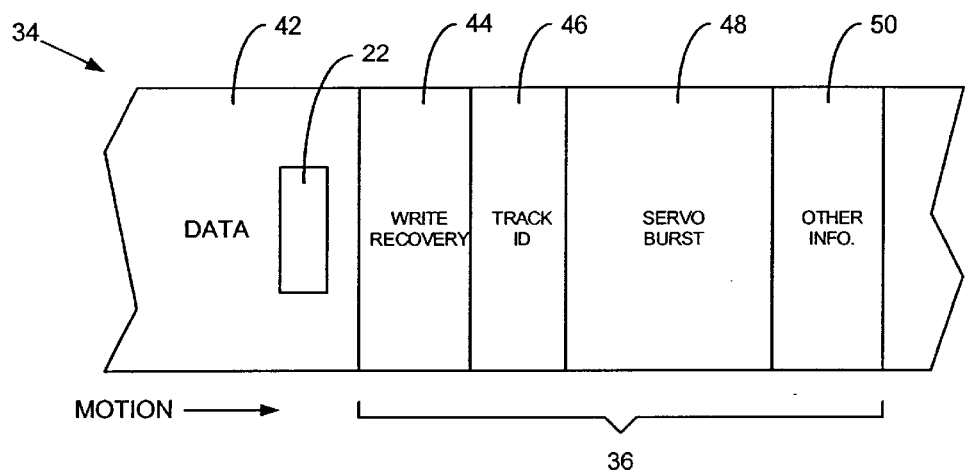
FIG. 3 illustrates a conventional related art schematic representation of information stored on storage media.
Figure 4:
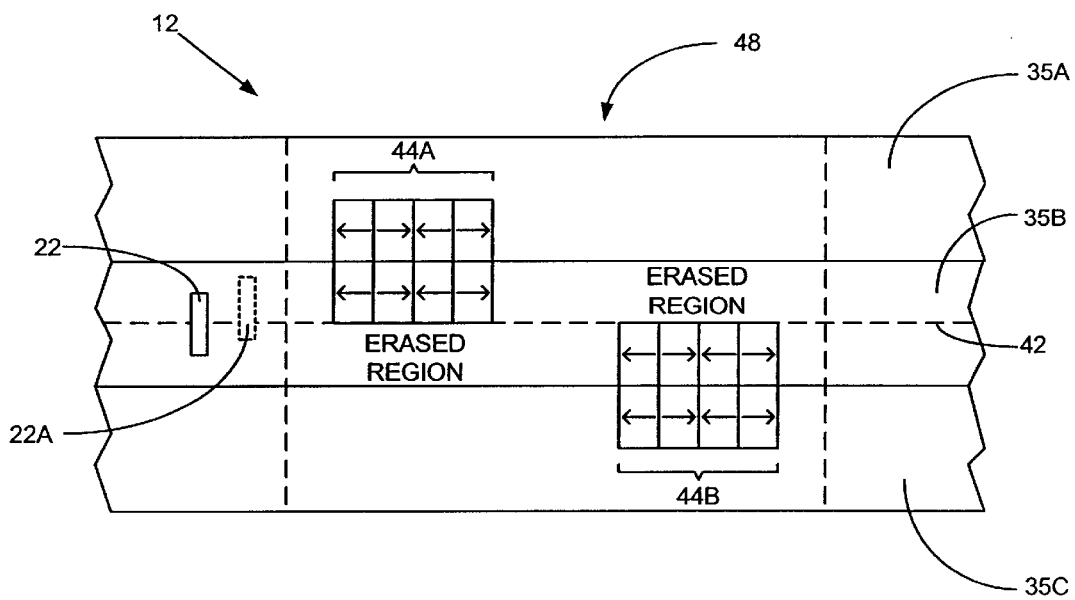
FIG. 4 illustrates a conventional related art schematic representation of a split burst amplitude servo pattern.
Figure 5:
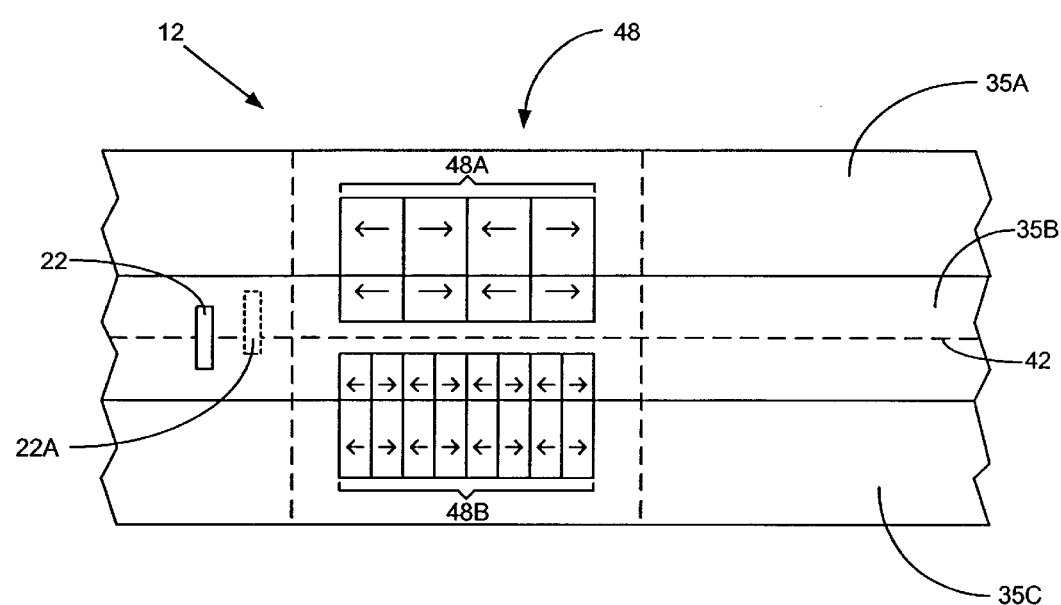
FIG. 5 illustrates a conventional related art schematic representation of a dual-frequency 1F/2F servo pattern.
Figure 6:
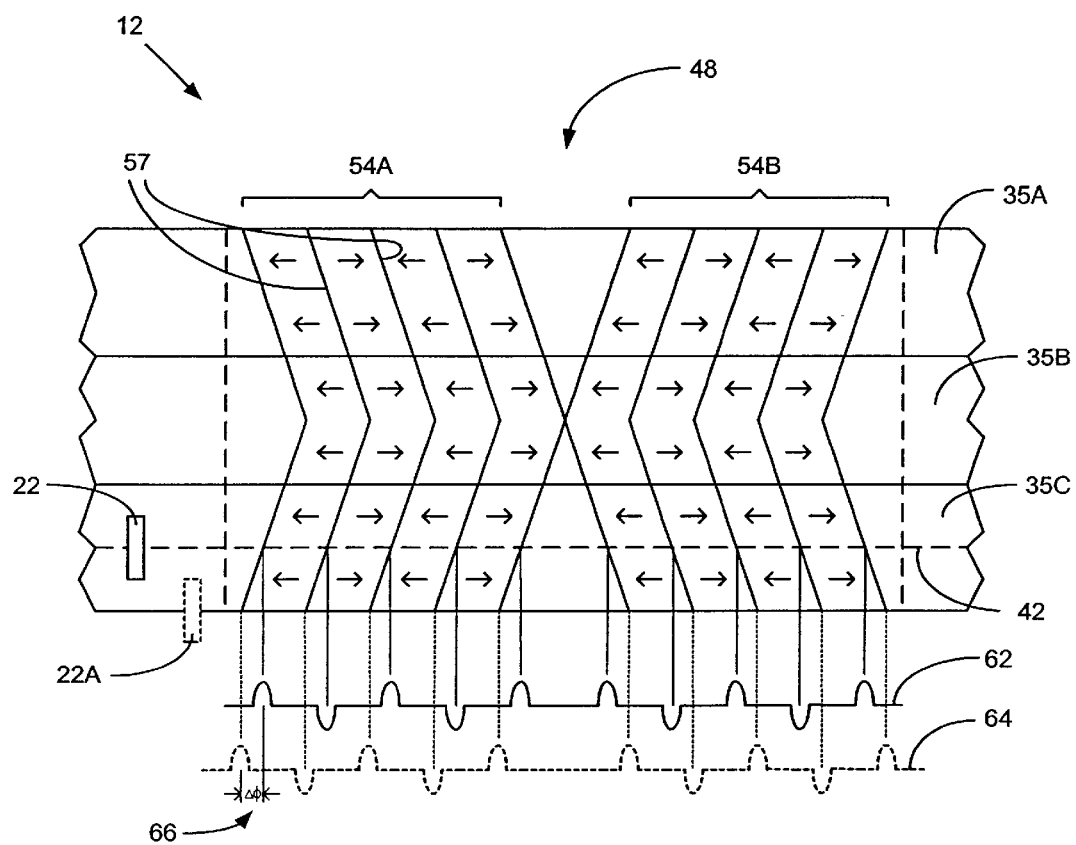
FIG. 6 illustrates a conventional related art schematic representation of a phase servo pattern.
Figure 7:
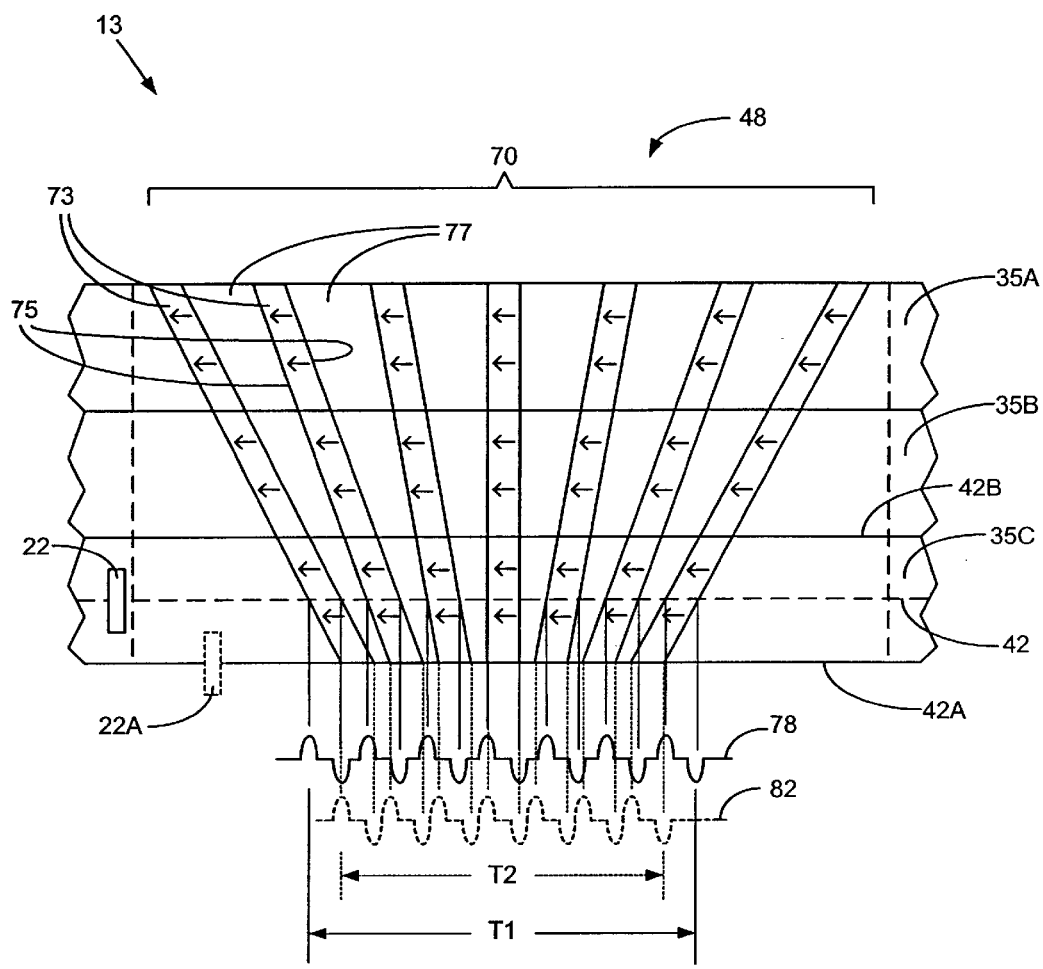
FIG. 7 illustrates one embodiment of a frequency modulation servo pattern according to the present invention.

According to one embodiment, the present invention is directed to an absolute frequency modulation pattern for generating a position error signal on a storage medium. FIG. 7 illustrates one embodiment of a frequency modulation servo pattern 70 for encoding on a servo sector 48 of a storage medium 13 according to the present invention. In the illustrated embodiment, the servo pattern 70 includes a fan-like shaped structure within the servo sector 48 of the storage medium 13 for generating absolute frequency modulation read-back signals 78, 82 that are proportional to the position of the read head 22 within one track or across one or more tracks 35A–C of the storage medium 13. The fan shaped structure of the servo pattern 70 is realized by forming several elements 73 generally in the shape of a rectangle or parallelogram in a spaced apart relationship on the storage medium 13 such that the distance between the elements 73 is greater at one end of the servo pattern 70 than they are at the opposite end.

In one embodiment, the absolute frequency modulation servo pattern 70 includes a number of elongated elements 73 arranged as a fan-like structure that spans one or more tracks 35A–C of the storage medium 13. In one embodiment, an erased region 77, e.g., a region which has not been magnetized, separates the elongated elements 73. In operation, as the read head 22 traverses the magnetic domain boundaries 75 defined by the elongated elements 73 and the erased regions 77 along, e.g., the line 42 of track 35C, the read head 22 detects the transitions and generates corresponding pulses in the read-back signal 78 over a time period of T1. The pulses of the read-back signal 78 are generated when the read head 22 traverses each edge of the domains 75 of elements 73 while sweeping at a constant velocity across the surface of the storage medium 13 along the track 35C. The disk drive controller reads the absolute frequency of the read-back signal 78 generated by the read head 22 as a function of the position of the read head 22 within the track 35C.

The signal 78 has a given frequency (determined as the inverse of the total number of pulses within the period T1). However, as the read head 22 drifts from the line 42 position and moves towards a second position within the track 35C, the position indicated by the drifted read head 22A, the magnetic domains 75 are physically spaced closer together due to the fan-like structure configuration of the servo pattern 70. Accordingly, as the drifted read head 22A deviates from the line 42 position and moves towards the lower part 42A of the track 35C, the frequency of the signal generated by the read head 22A traversing the magnetic domains 75 increases (e.g., the same number of magnetic domains 75 will be traversed over a shorter period T2). Thus, the frequency-modulated read-back signal 82 will have a higher frequency than the frequency-modulated read-back signal 78. Likewise, as the drifted read head 22A moves upwardly beyond the line 42 position toward the higher portion 42B of the track 35C, the frequency of the read-back signal decreases because the magnetic domain transitions 75 are physically spaced further apart.

Those skilled in the art will appreciate that due to the continuous nature of the fan-like servo pattern 70, the frequency of the output signal generated by the drifted read head 22A between lines 42B to 42A will vary continuously as a function of the position of the read head 22A within the track 35C and also across the multiple tracks 35A–C that the read head 22 happens to be traversing at the time it encounters the servo sector 48 along the tracks 35A–C. The continuously varying frequency modulation pattern 70 can be written to the storage medium 13 using conventional writing techniques, e.g., the same technique used for conventional phase patterns. Furthermore, those skilled in the art will appreciate that the elements 73 forming the fan-like structure of the servo pattern 70 do not have to be defined as magnetic domains. The scope of the concept of generating or forming a frequency modulation pattern on the storage medium 13 is not limited to conventional magnetic writing techniques and can be formed by other manufacturing methods described hereinafter, such as by etching, photolithography, embossing and the like.

The frequency modulation pattern 70 is formed so as to produce a read-back signal 78, 82 whose frequency varies continuously as a function of the position of the read head 22 within a given track 35A–C independent of any variations in signal amplitudes between read-back signals 78 and 82, for example. The relationship is maintained across the multiple tracks 35A–C where the servo pattern 70 is defined. In contrast to the dual-frequency 1F/2F pattern 48, described hereinbefore, in which the same two discrete frequencies are generated by the magnetic domains 48A and 48B within one track, the frequency modulation pattern 70 produces readback signals 78 and 82, which vary continuously across several tracks 35A–C. Furthermore, the discrete frequency signals produced by the 1F/2F patterns are always present in the output signal generated by the read head 22 and vary only relatively in terms of amplitude, not frequency.

Figure 8:
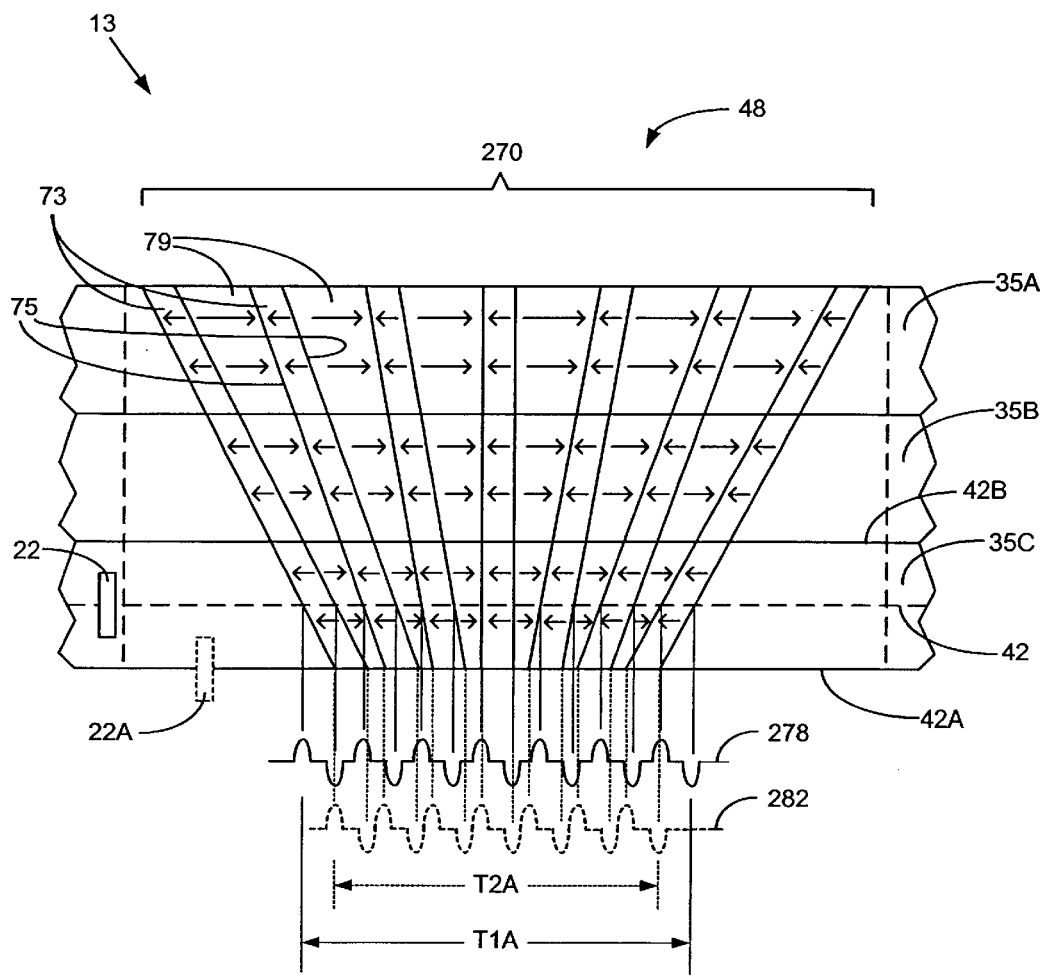
FIG. 8 illustrates another embodiment of a frequency modulation servo pattern according to the present invention.

FIG. 8 illustrates one embodiment of the present invention whereby a magnetic region 79 is formed between the elongated elements 73. The magnetic region 79 is interposed between the elongated elements 73 and it is magnetized such that the magnetic domains within the region 79 have an opposite polarity as the magnetic domains within the elongated elements 73. In operation, as the read head 22 traverses the magnetic domain boundaries 75 defined by the elongated elements 73 and the interposed regions 79, along, e.g., the line 42 of track 35C, the read head 22 detects the transition and generates corresponding pulses in the readback signal 278 over a time period of T1A. As described hereinbefore, the signal 278 has a given frequency (determined as the inverse of the total number of pulses within the period T1A). Furthermore, as the read head 22 drifts from the line 42 position and moves towards the second position within the track 35C, the position indicated by the drifted read head 22A moving along line 42A, the drifted read head 22A generates a frequency-modulated read-back signal 282 over period T2A which will have a higher frequency than the frequency-modulated read-back signal 278. The rest of the operation is similar to that described hereinbefore with reference to FIG. 7.

Figure 9A:
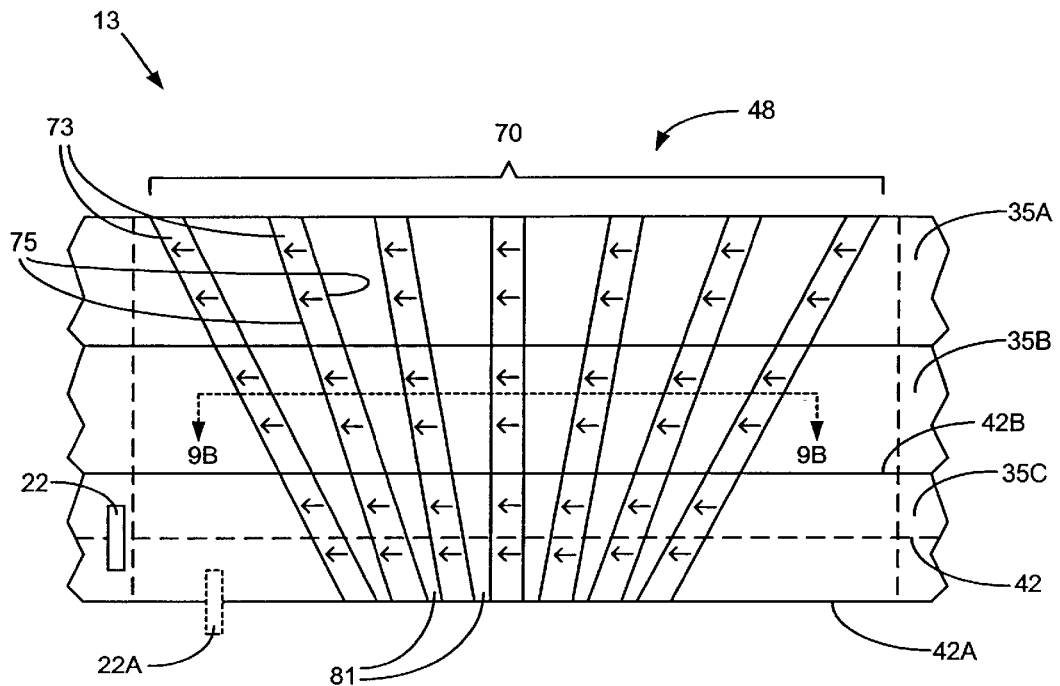
FIG. 9A illustrates one embodiment of an impressed frequency modulation servo pattern according to the present invention.

FIG. 9A illustrates one embodiment of the present invention whereby a region 81 is impressed on the surface of the disk 13 and is interposed between the elongated elements 73. The region 81 can be impressed on the surface of the disk 13 by way of etching, photo-lithography or embossing methods, for example. As discussed hereinbefore, as the read head 22 traverses the magnetic domain boundaries 75 defined by the elongated elements 73 and the interposed etched or embossed regions 81, along, e.g., the line 42 of track 35C, the read head 22 detects the transition formed by the elongated elements 73 and the etched or embossed regions 81 and generates a corresponding frequency-modulated read-back signal having a first frequency. As the read head 22 drifts from the line 42 position and moves towards the line 42A position within the track 35C, the position indicated by the drifted read head 22A, the drifted read head 22A generates a frequency-modulated read-back signal having a second, higher, frequency. The rest of the operation is similar to that described hereinbefore with reference to FIGS. 7 and 8.

Figure 9B:
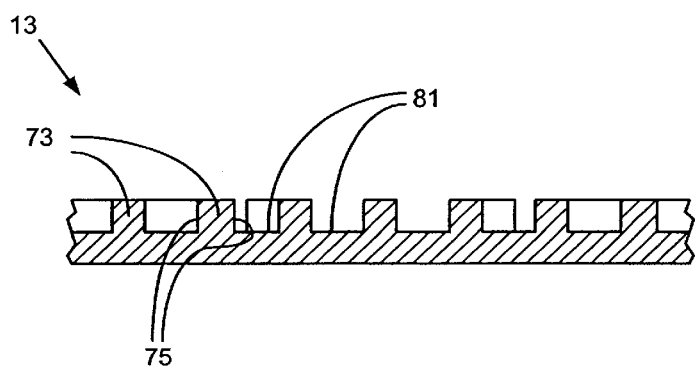
FIG. 9B illustrates a cross-section of the servo pattern of FIG. 9A taken along the line 9B—9B according to the present invention.

FIG. 9B illustrates a cross-section of the track 35B of the disk 13 taken along line 9B—9B. The impressed region 81 is formed between the elongated elements 73 thereby forming the magnetic domain boundaries 75. As discussed hereinbefore, as the read head 22 traverses the magnetic domain boundaries 75 it generates a frequency-modulated read-back signal that is indicative of the read-head's 22 position within the tracks 35A–C.

Figure 10:
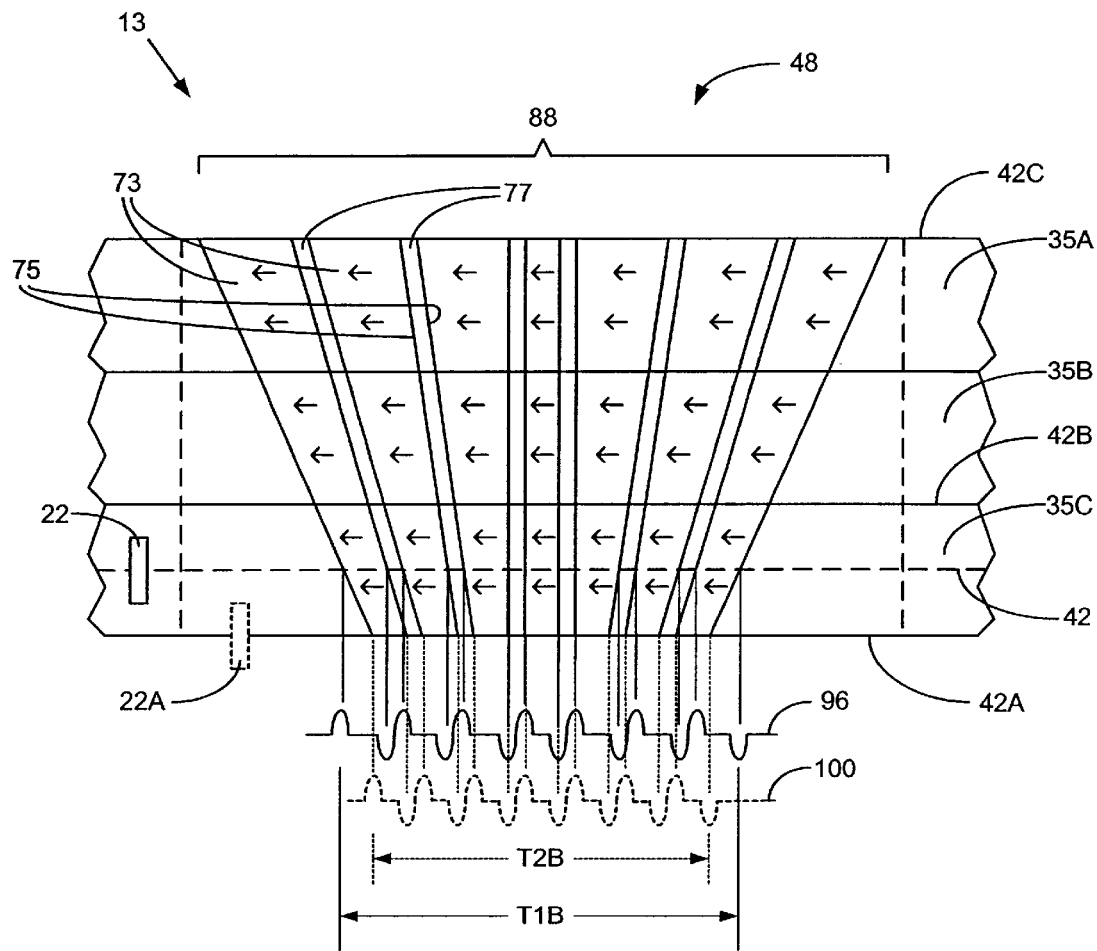
FIG. 10 illustrates another embodiment of a frequency modulation servo pattern according to the present invention.

FIG. 10 illustrates another embodiment of a frequency modulation servo pattern 88 according to the present invention. As illustrated therein, the shape of the individual elements 73 is not limited to rectangular or parallelogram forms. Accordingly, the frequency modulation servo pattern 88 may be realized in servo sector 48 of storage medium 13 by forming the individual elements 73 of the fan-like structure of the servo pattern 88 in the form of a trapezoid, for example, and having the erased region 77 interposed between the elongated elements 73. The basic principle of operation for generating absolute frequency modulation read-back signals 96, 100, however, is the same as for the structure illustrated in FIG. 7. For example, the fan shaped servo pattern 88 traverses one or more tracks 35A–C on the storage medium 13. As the read head 22 traverses along the line 42 of the track 35C at a constant velocity over the storage medium 13 it will encounter magnetic domains 75 at a frequency of 1/T1B, thereby generating a frequency modulation read-back signal 96 having the same frequency. As the read head 22 drifts to the position of read head 22A along line 42A, the frequency of the read-back signal 100 increases because the elements 73 of the fan-like servo pattern 88 are spaced closer together. Accordingly, the drifted read head 22A traversing across line 42A will encounter the magnetic domains 75 at a higher frequency and will generate a frequency modulation read-back signal 100 having a higher frequency than read-back signal 96.

Those skilled in the art will appreciate that the frequency of detecting the magnetic domains 75 will vary continuously between the two extremes of the fan shaped servo pattern 88. The number of total pulses (e.g., magnetic domains 75 detected), however, will always remain the same. For example, as the read head 22 traverses along the line 42 of the track 35C, it will generate a read-back signal 96 having a total number of pulses equal to the number of magnetic domains 75 traversed over a transition period of T2B. As the read head drifts to the position indicated by the shifted read head 22A, a read-back signal 100 will be generated having the same number of total pulses over the period T1B, which is shorter in time than the period T2B. Accordingly, as the read head 22 drifts from the upper portion 42B of track 35C to the lower portion 42A of the track 35C, the frequency of the frequency-modulated read-back signal generated will increase continuously as a function of the position of the read head 22 within the track 35C. The same relationship holds as the read head drifts from the upper portion 42C of track 35A to the lower portion 42A of track 35C. Accordingly, the actual position of the read head 22 can be determined as a function of a continuously varying frequency-modulated read-back-signal (e.g., read-back signals 96, 100). Those skilled in the art will appreciate that a common objective is to restore the position of the read head 22 to a desired portion of the storage medium 13.

Figure 11:
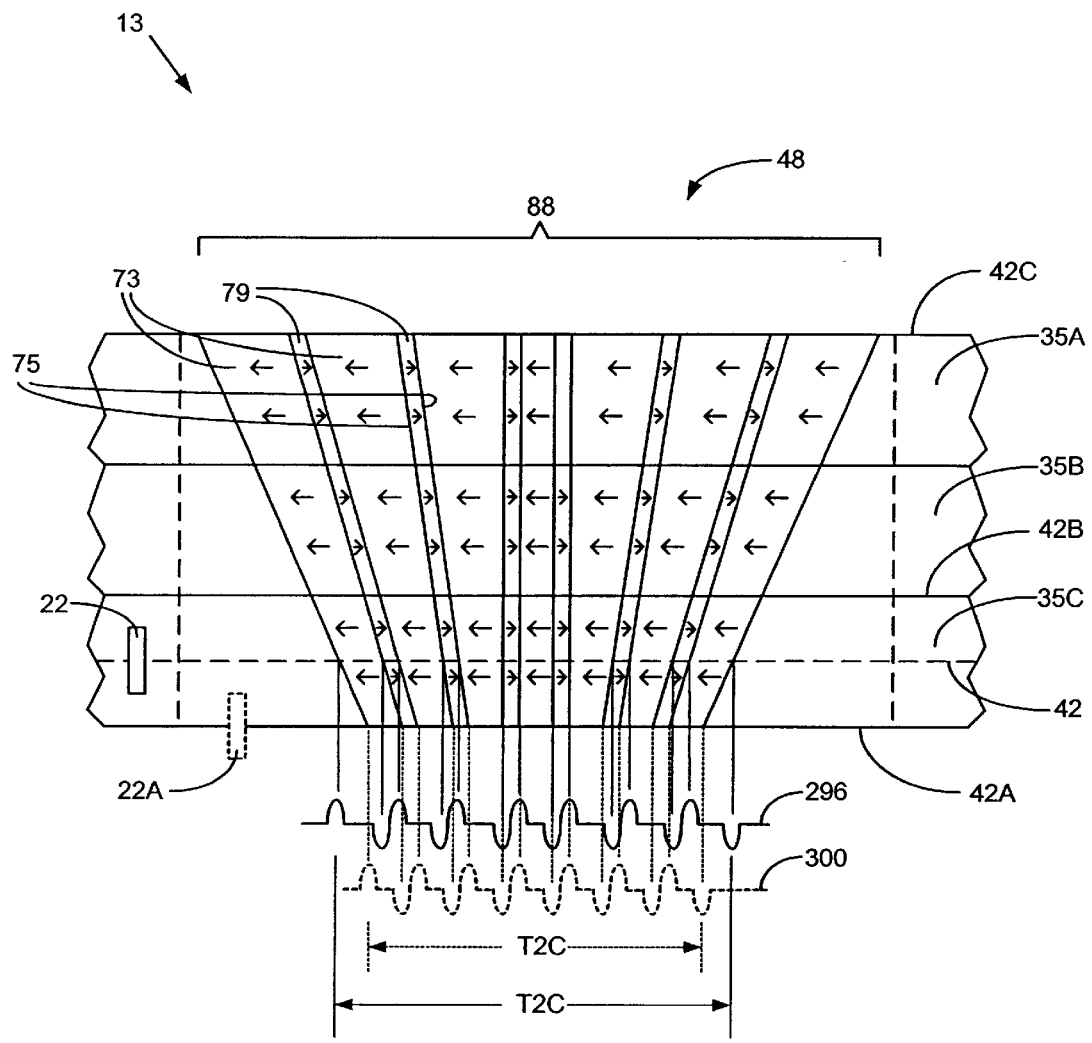
FIG. 11 illustrates another embodiment of a frequency modulation servo pattern according to the present invention.

FIG. 11 illustrates one embodiment of the invention whereby a magnetic region 79 is formed between the elongated elements 73. The magnetic region 79 is interposed between the elongated elements 73 and it is magnetized such that the magnetic domains within the region 79 have an opposite polarity as the magnetic domains within the elongated elements 73 having magnetic regions 79 interposed between the elements 73. The read head 22 generates a first signal 296 along line 42 over period T2C. The displaced read head 22A generates a second signal 300 along line 42A over period T1C. The operation of this embodiment is similar to the operation of the embodiment described hereinbefore with reference to FIG. 10.

Figure 12A:
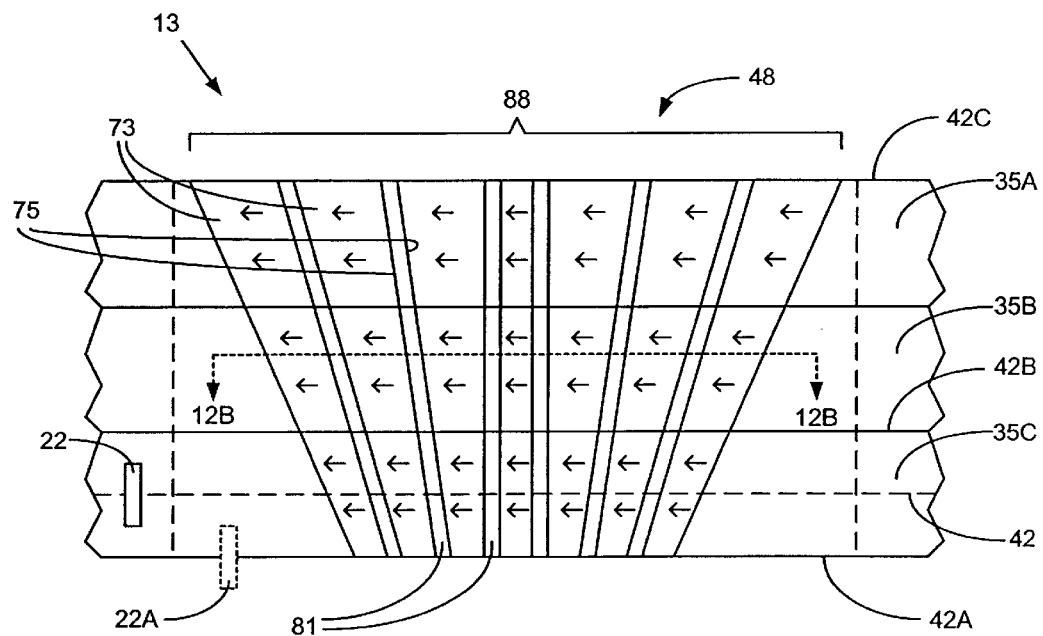
FIG. 12A illustrates another embodiment of an impressed frequency modulation servo pattern according to the present invention.

FIG. 12A illustrates one embodiment of the present invention whereby a region 81 is impressed on the surface of the disk 13 and is interposed between the elongated elements 73. As discussed hereinbefore, as the read head 22 traverses the magnetic domain boundaries 75 defined by the elongated elements 73 and the interposed etched or embossed regions 81, along, e.g., the line 42 of track 35C, the read head 22 detects the transition formed by the elongated elements 73 and the etched or embossed regions 81 and generates a corresponding frequency-modulated read-back signal having a first frequency. As the read head 22 drifts from the line 42 position and moves towards the line 42A position within the track 35C, the position indicated by the drifted read head 22A, the drifted read head 22A generates a frequency-modulated read-back signal having a second, higher, frequency. The rest of the operation is similar to that described hereinbefore with reference to FIGS. 7, 8, 10 and 11.

Figure 12B:
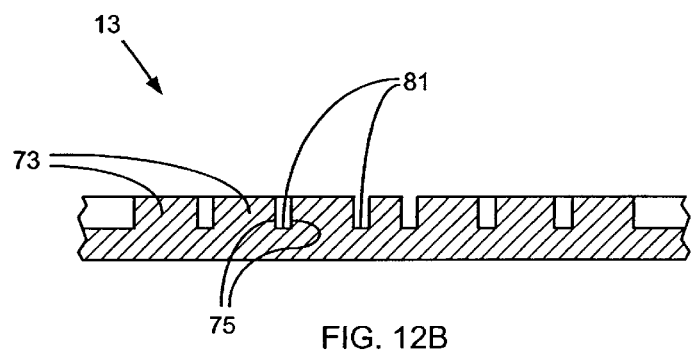
FIG. 12B illustrates a cross-section of the servo pattern of FIG. 12A taken along the line 12B—12B according to the present invention.

FIG. 12B illustrates a cross-section of the track 35B of the disk 13 taken along line 12B—12B. The impressed region 81 is formed between the elongated elements 73 thereby forming the magnetic domain boundaries 75. As discussed hereinbefore, as the read-head traverses the magnetic domain boundaries 75 it generates a frequency-modulated read-back signal that is indicative of the read-head's 22 position within the tracks 35A–C.

Figure 13A:
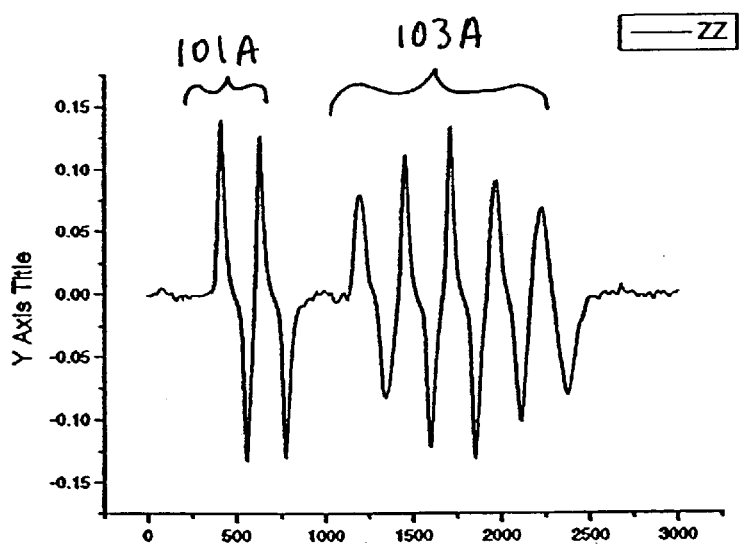
FIGS. 13A–C illustrate one embodiment of a read-back absolute frequency modulation signal at various frequencies according to the present invention.
Figure 13B:
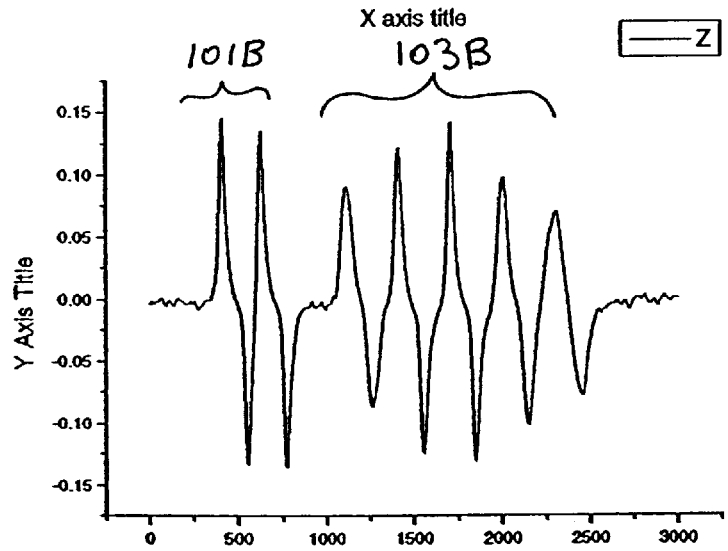
Figure 13C:
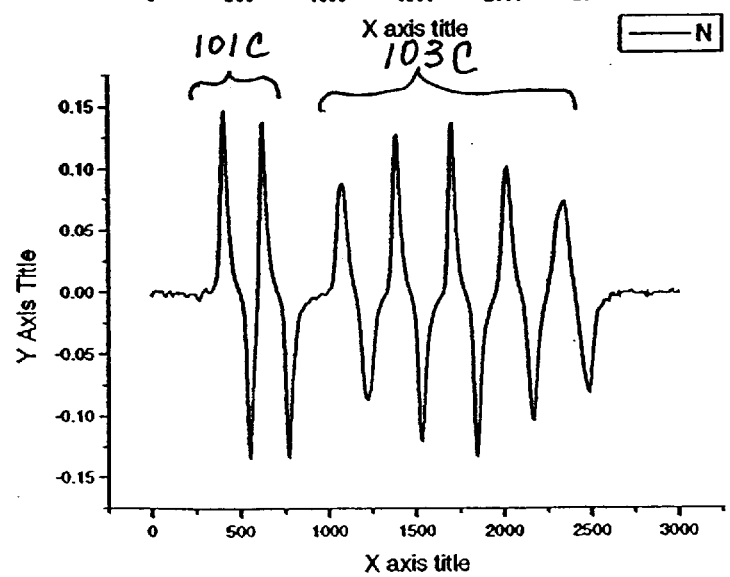

Turning now to FIGS. 13A–C, an absolute frequency modulation read-back signal at various frequencies is illustrated. FIG. 13A illustrates a plot of a read-back signal 103A in a high frequency region of the frequency modulation servo pattern 70, 88. FIG. 13B illustrates a plot of a read-back signal 103B in a medium frequency region of the frequency modulation servo pattern 70, 88. Finally, FIG. 13C illustrates a read-back signal 103C in a low frequency region of the frequency modulation servo pattern 70, 88. The two pulses 101A–C preceding the read-back signals 103A–C, respectively, are synchronization pulses and generally do not form a part of the frequency-modulated read-back signals 103A–C.

Figure 14:
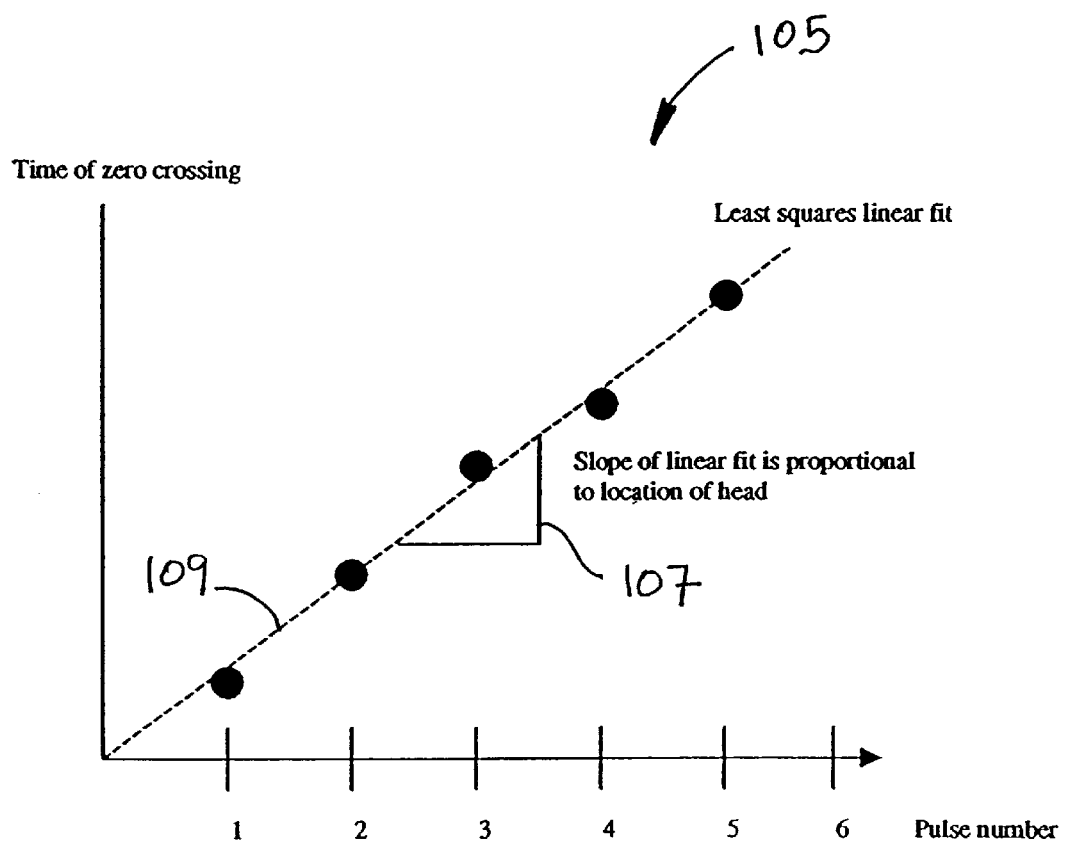
FIG. 14 illustrates one embodiment of a demodulation technique according to the present invention.

According to one embodiment, the position of the read head 22 can be demodulated from the read-back signals using a least squares linear fit demodulation technique. FIG. 14 is a plot illustrating such a technique. The pulse number corresponding to the read head 22 traversing a magnetic domain 75 is referenced along the X-axis and the time of zero crossing is referenced along the Y-axis. The reason that the pulses time do not lie exactly on a line is that there will always be some noise in the measured read-back signal. The slope 107 of the least squares fit 109 is proportional to the frequency of the read-back signal 103 and thus to the position of the read head 22 on the storage medium 13. More specifically, the slope 107 of the least squares linear fit 109 at the times at which the read-back signal 103 crosses zero is a measure of the frequency of the read-back signal. 103 and thus is a measure of the position of the read head 22 in the cross-track direction.

Figure 15:
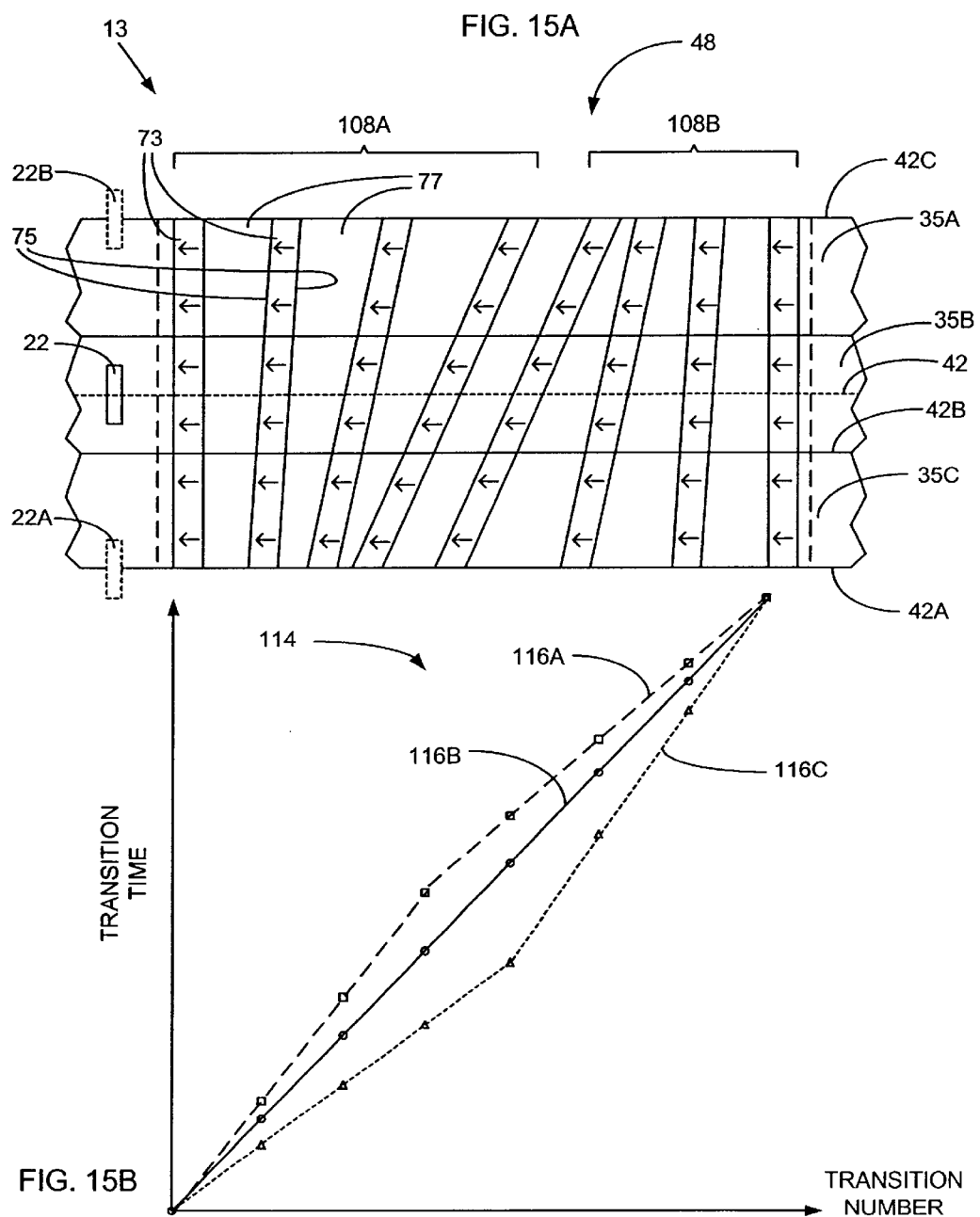
FIG. 15A illustrates one embodiment of a differential frequency modulation servo pattern according to the present invention.
FIG. 15B illustrates one embodiment of a plot of transition time versus transition number of a differential frequency modulation servo pattern according to the present invention.

The present invention also provides several embodiments of structures that can be employed to generate a differential frequency-modulated signal. FIG. 15A illustrates one embodiment of a servo pattern 108A–B for generating a differential frequency-modulated read-back signal. The servo pattern 108A–B is realized by forming a first section 108A and a second section 108B. Each section 108A–B includes a number of elongated elements 73 in the shape of, for example, rectangles or parallelograms that are formed in a spaced apart relationship as shown is FIG. 15A. The spaced apart elements 73 and the erased regions 77 interposed therebetween define the magnetic domain boundaries 75. However, instead of positioning the elements 73 in a fan-like structure, the elements 73 may be positioned such that the first element is placed substantially orthogonal to the tracks 35A–C while the subsequent elements are spaced apart such that they form a decreasing angle relative to the tracks 35A–C until a halfway point of the servo pattern 108A–B is reached. Then, in the second section 108B, the elements 73 may be spaced apart such that they form an increasing angle relative to the tracks 35A–C until the last element is positioned substantially orthogonal to the tracks 35A–C.

The differential frequency modulation concept is illustrated in FIG. 15B where a plot 114 is shown illustrating the relationship between the "Transition Time" (along the Y-axis) and the "Transition Number" (along the X-axis). As with the absolute frequency-modulated patterns discussed hereinbefore, the number of pulses generated by the read head 22 while traversing the elongated elements 73 at magnetic domains 75 will be the same regardless of the position of the read head 22 within the track 35B or across multiple tracks 35A–C. The relative points of the differential servo pattern 108A–B are shown on the plot 114. As the read head 22 travels across the plurality of elongated elements 73 (e.g., or magnetic domains 75), corresponding to the transition number represented along the X-axis, the corresponding transition time is plotted along the Y-axis.

The total span of the differential frequency modulation pattern 108A–B is divided between portion 108A and portion 108B. The 108A portion represents the first half of the transition and the 108B portion represents the second half of the transition. When the read head travels along the line 42 of track 35B across the entire span of the servo pattern 108A–B, the corresponding plot of the differential read-back signal 116B has a constant slope. As the read head 22 drifts to a position 42B along the upper portion of track 35A, indicated by the drifted read head 22B, the corresponding plot of the differential read-back signal 116A will have a greater slope while traversing the 108A portion of the servo pattern 108A–B, and will have a correspondingly lesser slope while traversing the 108B portion of the servo pattern 108A–B. On the other hand, as the read head 22 shifts to another position 42A along the lower portion of track 35C indicated by the drifted read head 22A, the corresponding differential read-back signal 116C will have a lesser slope while traversing the 108A portion, and a greater slope while traversing the 108B portion of the servo pattern 108A–B.

Although the total number of pulses generated by the read head 22 remains the same, the relative period between the first portion 108A and the second portion 108B of the servo pattern 108 will vary as illustrated in the graph of FIG. 15B. Therefore, the period that the read head 22 takes to traverse the 108A and 108B portions of the servo pattern will vary as a function of the position of the read head 22 on the storage medium 13. For example, plot 116B corresponding to the position of the read head 22 along the line 42 of track 35B will have an equal transition period for the 108A and 108B portions and the servo sector 108A–B such that the difference between the two periods is "$108A_T-108B_T=0$." Plot 116C corresponding to the read head 22A position 42A along the lower portion of track 35C indicates a shorter transition period when the read head 22A traverses the 108A portion rather than when it traverses the 108B portion such that the difference between the periods is "$108A_T-108B_T<0$." Further, plot 116B corresponding to the read head 22B position 42B along the upper portion of track 35A indicates a greater transition period when the read head 22B traverses the 108A portion rather than when it traverses the 108B portion such that the difference between the periods is "$108A_T-108B_T>0$."

The disk drive controller determines the difference in the relative slopes of the plots 114 and thus determines the position of the read head 22 on the storage medium 13. Those skilled in the art will appreciate that the basic function for determining the relative slopes can be implemented used well-known signal processing techniques employing hardware and software algorithms or a combination thereof. It will be appreciated that several transitions may be required in order to fit the best line possible and obtain the best estimate of the relative slopes. The advantage of the differential frequency modulation technique is that it operates on the relative difference between the frequencies and not on the absolute frequency. One advantage of the differential frequency modulation technique is that the system can more easily discern the position of the read head 22 whenever the storage medium 13 does not move at precisely controlled speeds.

Figure 16:
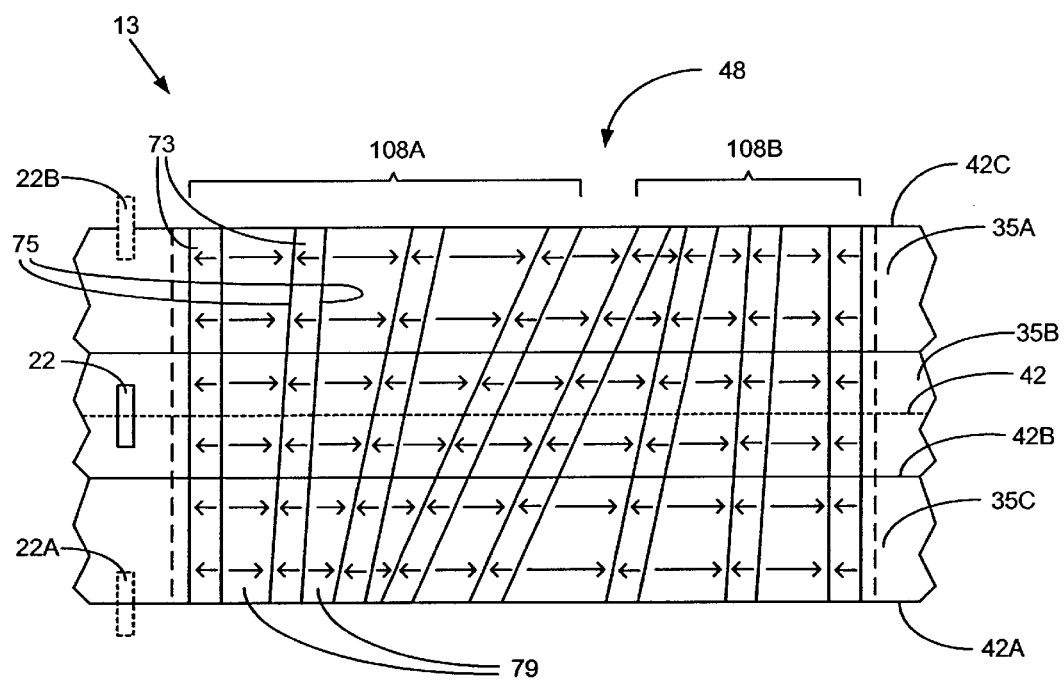
FIG. 16 illustrates one embodiment of a frequency modulation servo pattern formed by adjacent magnetic regions having opposite polarity according to the present invention.

FIG. 16 illustrates one embodiment of the servo pattern 108A–B for generating a differential frequency-modulated read-back signal. The servo pattern includes magnetic regions 79 interposed between the elongated elements 73. The magnetic regions 79 have a polarity opposite of the polarity of the elongated elements 73. The operation of generating a differential frequency-modulated read-back signal is similar to that described hereinbefore with reference to FIGS. 15A–B.

Figure 17A:
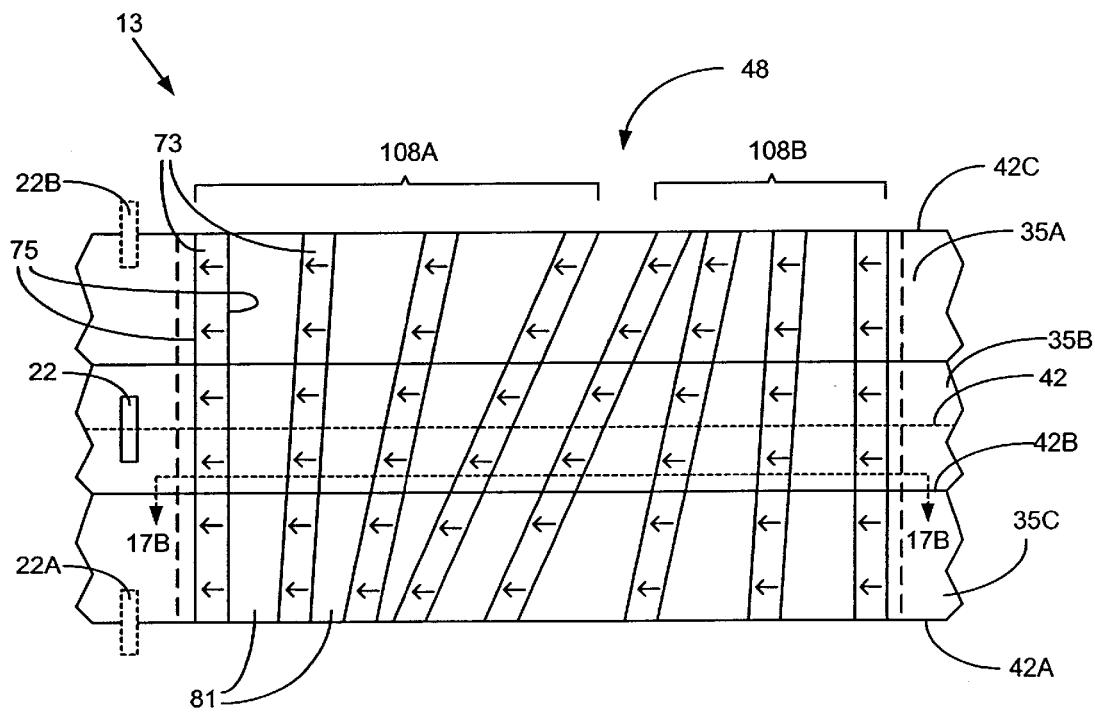
FIG. 17A illustrates one embodiment of an impressed differential frequency modulation servo pattern according to the present invention.

FIG. 17A illustrates one embodiment of the present invention whereby a region 81 is impressed on the surface of the disk 13 and is interposed between the elongated elements 73. The operation of generating a differential frequency-modulated read-back signal, however, is similar to that described hereinbefore with reference to FIGS. 15A–B and 16.

Figure 17B:
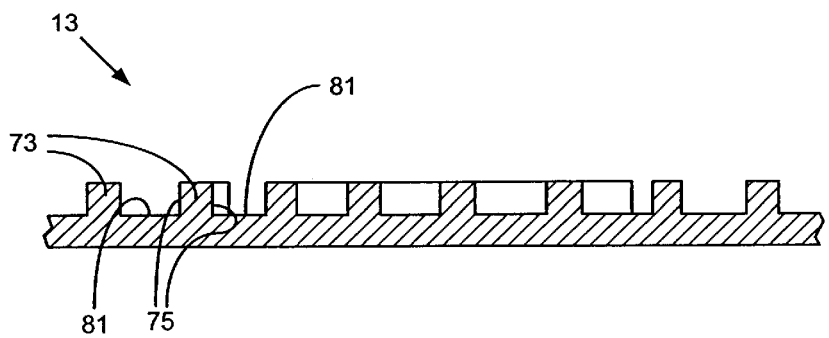
FIG. 17B illustrates a cross-section of the servo pattern of FIG. 17A taken along the line 17B—17B according to the present invention.

FIG. 17B illustrates a cross-section of the track 35B of the disk 13 taken along the line 17B—17B. The impressed region 81 is formed between the elongated elements 73 thereby forming the magnetic domain boundaries 75. As discussed hereinbefore, as the read-head 22 traverses the magnetic domain boundaries 75 it generates a differential frequency-modulated read-back signal that is indicative of the read-head's 22 position within the tracks 35A–C.

FIG. 18A illustrates another embodiment of a servo pattern 120A–B structure for generating a differential frequency modulation signal proportional to the position of the read head 22 within a number of tracks 35A–C formed on the storage medium 13. The servo pattern 120A–B is realized by forming individual elongated elements 73 in the shape of a trapezoid, rather than a rectangle or parallelogram. Erased regions 77 are interposed between the elongated elements 73 and together define the magnetic domains 75. In other respects, the principle of operation, i.e., generating a differential frequency modulation signal, is the same as the structure illustrated in FIGS. 15A–B, 16 and 17A–B.

FIG. 18B illustrates a plot of three separate differential frequency modulation read-back signals plotted along lines 128 for various positions of the read head 22, 22A or 22B. The X-axis corresponds to the magnetic domain transition number, and the Y-axis corresponds to the transition time between the magnetic domains. For example, as read head 22 traverses along the line 42 of track 122B, a corresponding differential frequency output can be plotted along the curve 128B. However, as the read head 22 shifts to the position of the drifting read head 22A, along track 35C, the corresponding output differential frequency curve is 128C. On the other hand, as the read head 22 shifts to the position of the drifting read head 22B, along track 35A, the corresponding output differential frequency curve is 128A.

Figure 19:
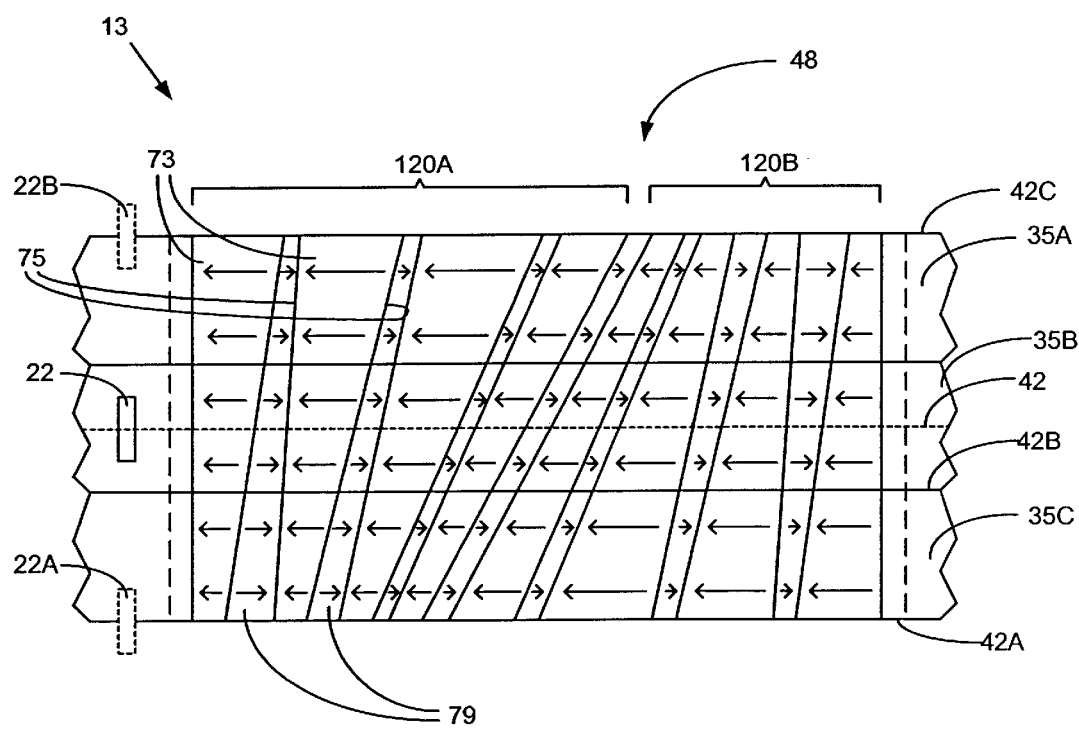
FIG. 19 illustrates another embodiment of a differential frequency modulation servo pattern according to the present invention.

FIG. 19 illustrates one embodiment of the servo pattern 120A–B for generating a differential frequency-modulated read-back signal. The servo pattern includes magnetic regions 79 interposed between the elongated elements 73. The magnetic regions 79 have a polarity opposite of the polarity of the elements 73. The operation of generating a differential frequency-modulated read-back signal, however, is similar to that described hereinbefore with reference to FIGS. 15A–B, 16, 17A–B and 18A–B.

Figure 20A:
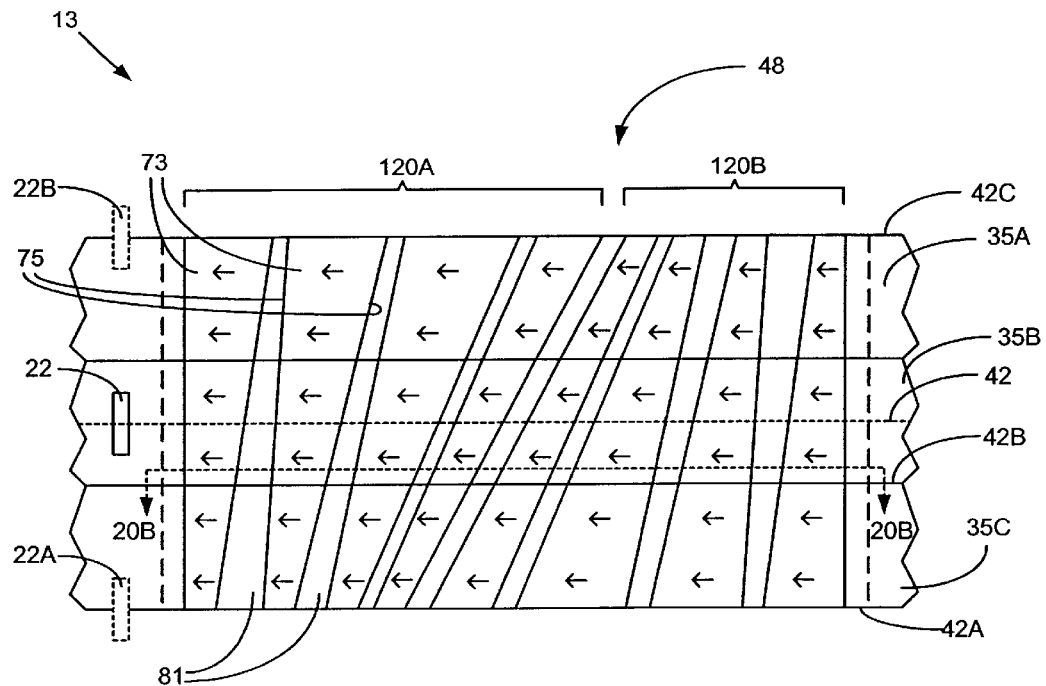
FIG. 20A illustrates one embodiment of an etched or embossed differential frequency modulation servo pattern according to the present invention.

FIG. 20A illustrates one embodiment of the present invention a region 81 is impressed on the surface of the disk 13 and is interposed between the elongated elements 73. The operation of generating a differential frequency-modulated read-back signal is similar to that described hereinbefore with reference to FIGS. 15A–B, 16, 17A–B, 18A–B and 19.

Figure 20B:
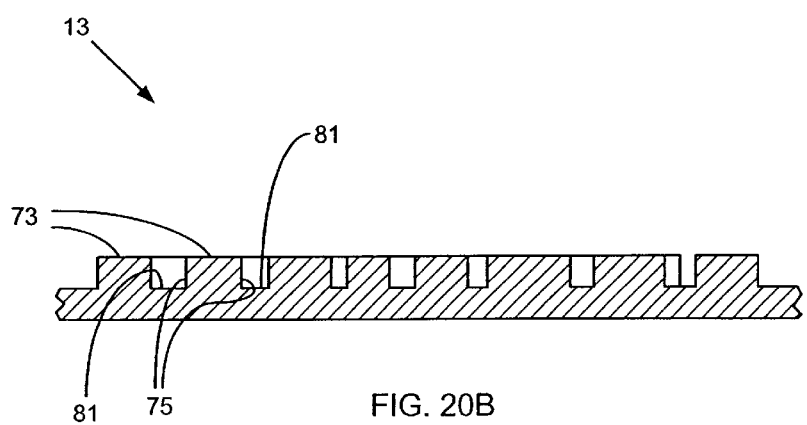
FIG. 20B illustrates a cross-section of the servo pattern of FIG. 20A taken along the line 20B—20B according to the present invention.

FIG. 20B illustrates a cross-section of the track 35B of the disk 13 taken along the line 20B—20B. The impressed region 81 is formed between the elongated elements 73 thereby forming the magnetic domain boundaries 75. As discussed hereinbefore, as the read-head traverses the magnetic domain boundaries 75 it generates a differential frequency-modulated read-back signal that is indicative of the read-head's 22 position within the tracks 35A–C.

Figure 21:
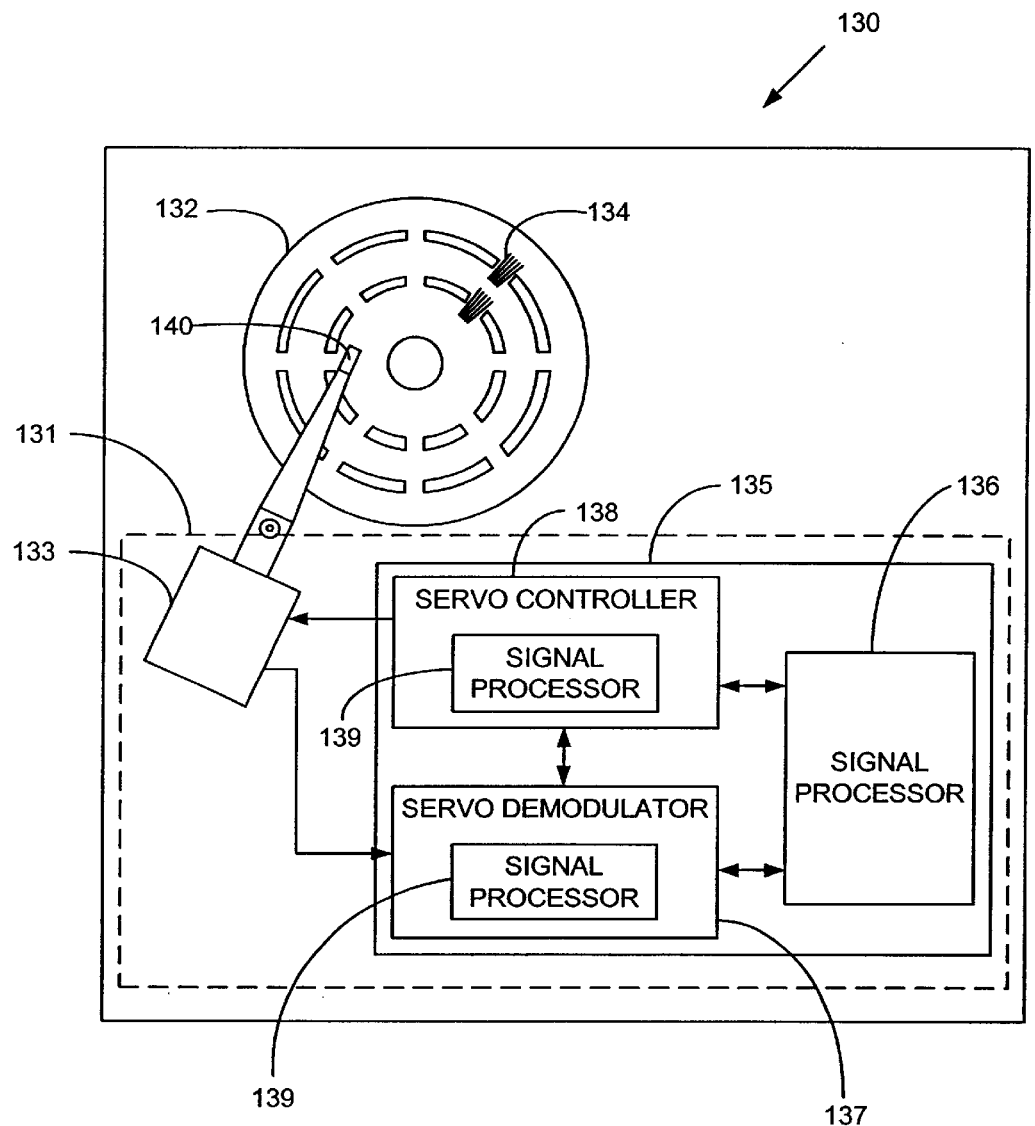
FIG. 21 illustrates one embodiment of a storage system having a frequency modulation servo pattern according to the present invention.

FIG. 21 illustrates one embodiment of a storage system 130 associated with a storage medium 132 having a frequency modulation servo pattern 134 encoded thereon. The storage medium 132 may be formed of a magnetic, optical or any other suitable medium. The system 130 also includes a servo control system 131, which includes a servo 133 (e.g., a voice coil motor) and a disk drive controller 135. The disk drive controller 135 includes a signal processor 136, a servo demodulator 137, and a servo controller 138. The servo demodulator 137 receives read-back signals generated by the read head 140 as it traverses the frequency modulation servo pattern 134. The servo demodulator 137 includes a signal processor 139 for generating a position error signal based on a frequency-modulated read-back signal, which may be provided to the signal processor 136 of the servo controller 138, which controls the servo 133 to adjust the position of the read head 140 relative to the storage medium 132 in accordance with the position error signal. In one embodiment the servo controller 138 also includes a signal processor 139. Independent of whether the read back signal is of the absolute or differential frequency type, the read head 140 generates the position error signal and the disk drive controller 135 generates a position correction signal to restore the position if the read head 140 to its optimum position along the centerline of the current track.

Figure 22:
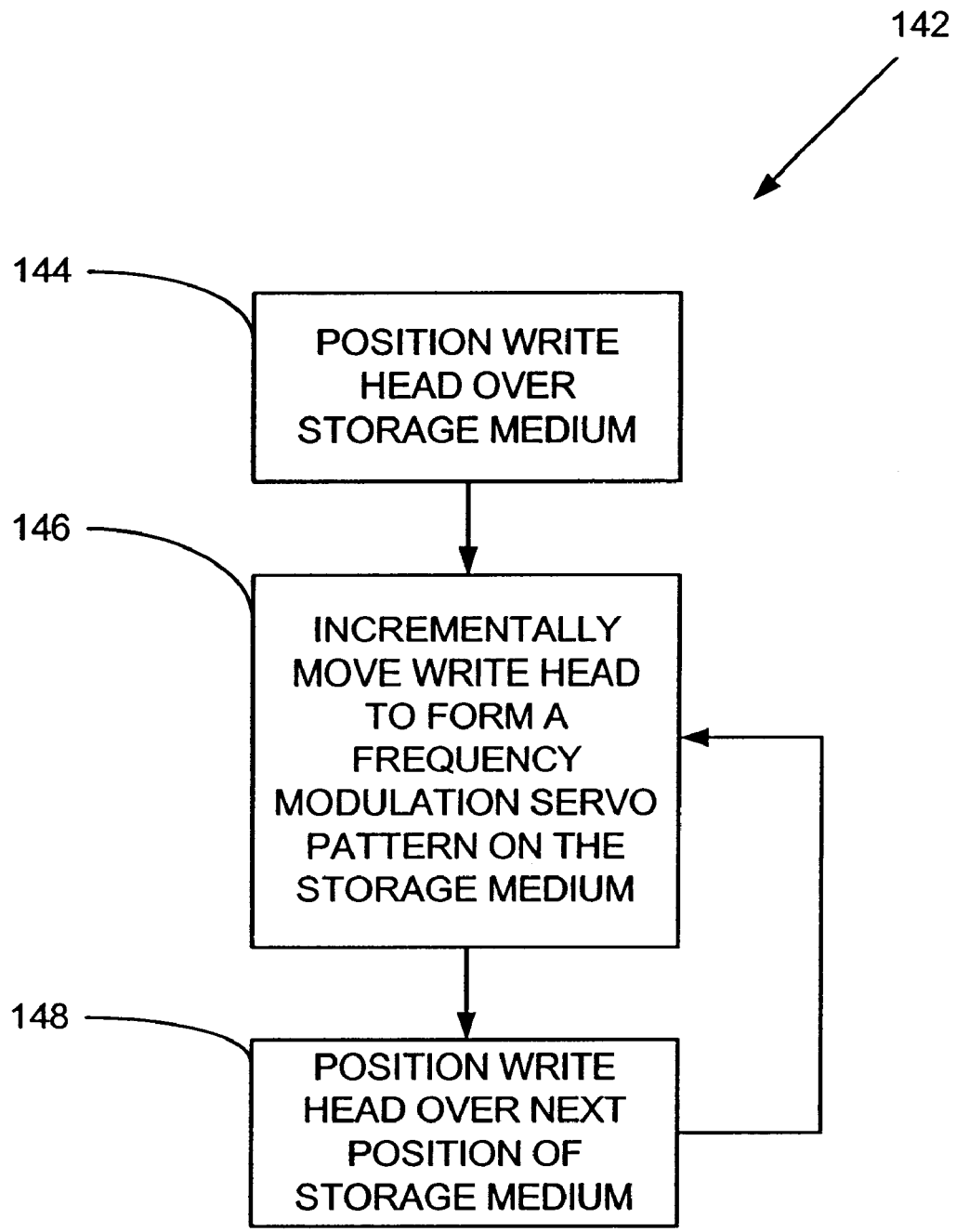
FIG. 22 illustrates one embodiment of a method of manufacturing a frequency modulation servo pattern on a storage medium according to the present invention.

FIG. 22 illustrates a method 142 of forming a frequency modulation servo pattern on a storage medium. At block 144, the write head is positioned over a magnetic storage medium where the frequency modulation pattern is to be formed. At block 146, once in position, the write head is moved incrementally across the surface of the storage medium from one portion to the next. At block 148, the storage medium is moved incrementally at certain predetermined time intervals. Accordingly, any one of the frequency modulation servo patterns 70, 88, 108A–B, 120A–B described hereinbefore may be written on the storage medium with a conventional write head.

Figure 23:
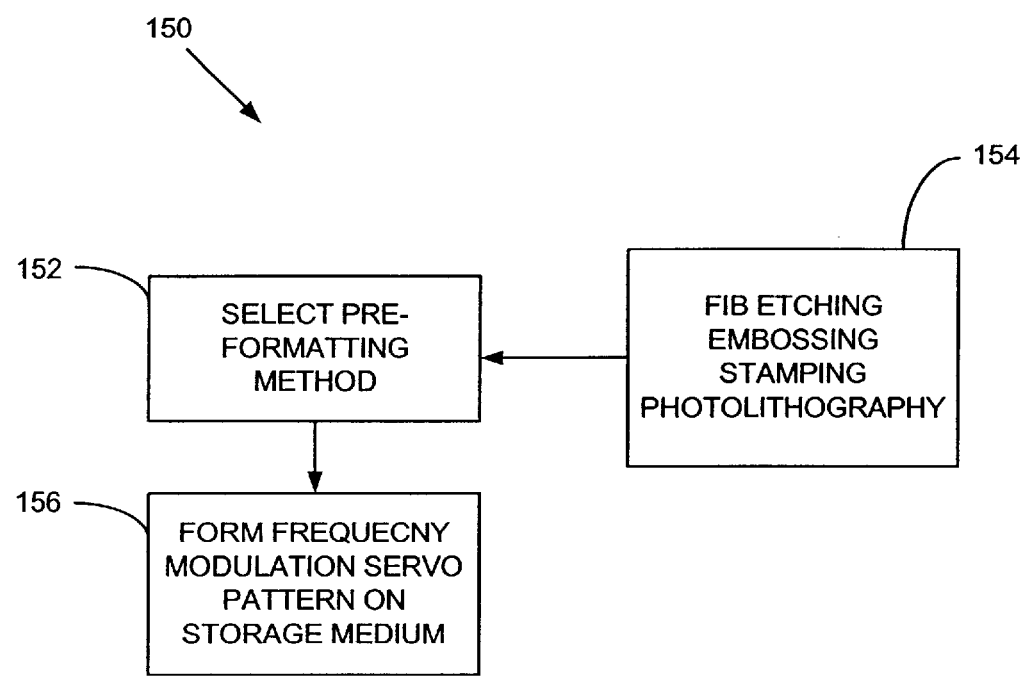
FIG. 23 illustrates one embodiment of a method of pre-formatted a storage medium with a frequency modulation servo pattern according to the present invention.

FIG. 23 illustrates a method 150 of pre-formatting any one of the frequency modulation servo patterns 70, 88, 108A–B, 120A–B on a storage medium according to one embodiment of the present invention. Pre-formatting the storage medium with the frequency modulation servo patterns 70, 88, 108A–B, 120A–B can be done as a additional step when the medium itself is being manufactured, which is more efficient than writing the servo pattern to the storage medium. Forming the servo pattern when the medium itself is manufactured also eliminates the constraint of forming the servo pattern using the fixed geometry of the write head, which is generally rectangular. At block 152 a pre-formatting method is selected from the group 154 including focused ion beam (FIB) etching, embossing, stamping and other forms of etching, imprinting by way of photolithography or electron beam lithography. In each of these techniques the actual geometry of the write head are much less restrictive. Those skilled in the art will appreciate that the pre-formatting methods can be utilized for magnetic recording media as well optical recording media. At step 156 a frequency modulation servo pattern is formed on the storage medium.

In one embodiment the pre-formatted pattern can be embossed on a magnetic recording medium in accordance with methods that are well known in the art. This method employs a similar technique used to manufacture optical disks, which are generally embossed or injected molded at the time of manufacture. In one embodiment the frequency modulation servo patterns may be formed on the recording medium by a photolithographic process similar to one used to manufacture electrical/electronic circuits. In one embodiment, the pre-formatted pattern may be formed by an electron beam lithography process similar to the one used to make photolithography masks for manufacturing electronic circuits.

According to another embodiment the pre-formatted pattern may be etched on a magnetic recording medium using the FIB etching technique. The FIB etching method may include firing a beam of gallium ions at the surface of the recording medium. As the gallium ions hit the surface of the medium, they knock off the atoms and molecules off the surface of the medium, thereby cutting a trench into the medium. The FIB method can form very small regions very accurately. One approach for forming a pre-formatted servo pattern on storage media for generating a position error signal is described in Jian-Gang Zhu et al., *Recording, Noise, and Servo Characteristics of Patterned Thin Film Media*, IEEE Transactions on Magnetics, Vol. 36, No. 1, January 2000, at 23–29, which is incorporated herein by reference in its entirety. Another approach for forming a pre-formatted servo pattern on storage media for generating a position error signal using FIB is described in Xiangdong Lin et al., *Investigation of Advanced Position Error Signal Patterns in Patterned Media*, Journal of Applied Physics, Vol. 87, No. 9, 1 May 2000, at 5117–19, which is also incorporated herein by reference in its entirety.

The foregoing description of the specific embodiments of the various embodiments of the invention has been presented for the purpose of illustration and description. It is not intended to be exhaustive or to limit the investigation to the precise form disclosed. Many modifications and variations are possible in light of the above teachings. It is intended that the scope of the invention be limited not with the description above but rather by the claims appended hereto.

What is claimed is:

1. A method of encoding a storage medium, comprising:
    forming a frequency modulation servo pattern within a servo sector of the storage medium for providing a read-back signal having a continuously varying frequency that is proportional to the position of a read head relative to the storage medium.

2. The method of claim 1, wherein forming the frequency modulation servo pattern is selected from the group consisting of forming an absolute frequency modulation servo pattern and forming a differential frequency modulation servo pattern.

3. The method of claim 1, wherein forming the frequency modulation servo pattern includes:
    positioning a magnetic recording head at a predetermined location on the storage medium; and
    magnetically recording the frequency modulation servo pattern on the storage medium.

4. The method of claim 1, wherein forming the frequency modulation servo pattern includes forming a frequency modulation servo pattern by physically altering the storage medium.

5. The method of claim 4, wherein forming the frequency modulation servo pattern is selected from the group consisting of focused ion beam etching the frequency modulation servo pattern on the storage medium, embossing the frequency modulation servo pattern on the storage medium, stamping the frequency modulation servo pattern on the storage medium, photolithographically etching the frequency modulation servo pattern on the storage medium, and electron beam lithography etching the frequency modulation servo pattern on the storage medium.

6. The method according to claim 1, wherein forming a frequency modulation pattern includes forming a pattern comprising a plurality of multi-sided elements, each element having a first end and a second end, such that a distance between sides of adjacent elements are spaced farther apart at the first end than at the second end.

7. The method according to claim 6, wherein forming a pattern comprising a plurality of multi-sided elements includes forming a pattern comprising a plurality of spaced apart multi-sided elements.

8. A disk drive, comprising:
    a storage medium including a frequency modulation servo pattern encoded within a servo sector of the storage medium;
    a head for reading the frequency modulation servo pattern and for producing a read-back signal therefrom;
    a servo demodulator in communication with the head for receiving the read-back signal and producing a position error signal therefrom; and
    a servo coupled to the head for moving the head relative to the surface of the storage medium in response to the position error signal, wherein the frequency modulation servo pattern comprises a plurality of contiguous magnetic domains having magnetic flux transitions at first and second boundaries, wherein the plurality of magnetic domains are in the shape of a fan having a first end and a second end, wherein the magnetic transitions are farther apart at the first end than at the second end, and wherein the frequency modulation servo pattern within the servo sector of the storage medium is for providing a read-back signal having a continuously varying frequency that is proportional to the position of a read head relative to the storage medium.

9. The disk drive of claim 8, wherein:
the storage medium is a magnetic disk; and
the head is a magnetic head.

10. The disk drive of claim 8, wherein the magnetic domains are spaced apart.

11. The disk drive of claim 8, wherein the frequency modulation servo pattern is selected from the group consisting of an absolute frequency modulation servo pattern and a differential frequency modulation servo pattern.

12. The disk drive of claim 8, wherein the frequency modulation servo pattern comprises a plurality of spaced apart elements arranged in the shape of a fan having a first end and a second end, wherein the elements are spaced farther apart at the first end than at the second end.

13. The disk drive of claim 8, wherein the frequency modulation servo pattern spans a plurality of tracks along a radial direction of the storage medium.

14. The disk drive of claim 8, wherein the frequency modulation servo patterns are arranged in a repeating pattern radially and circumferentially on the storage medium.

15. A servo control system for positioning a head assembly to a predetermined location relative to a storage medium, comprising:
a head assembly having at least one read head for reading a frequency modulation pattern encoded on a track on the storage medium and for generating a continuously varying frequency-modulated read-back signal therefrom that varies proportionally to a position of the read head relative to the storage medium, wherein the frequency modulation servo pattern comprises a plurality of contiguous magnetic domains having magnetic flux transitions at first and second boundaries, wherein the plurality of magnetic domains are in the shape of a fan having a first end and a second end, wherein the magnetic transitions are farther apart at the first end than at the second end, and wherein the frequency modulation servo pattern is formed within a servo sector of the storage medium is for providing a read-back signal having a continuously varying frequency that is proportional to the position of a read head relative to the storage medium;
a servo demodulator in communication with the head assembly for generating a position error signal from the read-back signal;
a servo coupled to the head assembly for positioning the head assembly relative to the storage medium; and
a servo controller in communication with the servo demodulator for controlling the servo in accordance with the position error signal from the servo demodulator.

16. The servo control system of claim 15, wherein the read assembly is for reading a frequency modulation servo pattern is selected from the group consisting of an absolute frequency modulation servo pattern and a differential frequency modulation servo pattern.

17. The servo control system of claim 15, wherein the head assembly is a magnetic head assembly.

18. A servo demodulator, comprising:
a signal processor for generating a position error signal based on a frequency-modulated read-back signal, wherein the frequency-modulated read-back signal continuously varies proportionally to a position of a head assembly relative to a track on a storage medium.

19. The servo demodulator of claim 18, wherein the signal processor is for generating the position error signal based on an absolute frequency-modulated read-back signal that varies continuously in accordance to a position of the head assembly relative to a track on the storage medium.

20. The servo demodulator of claim 18, wherein the signal processor is for generating the position error signal based on a differential frequency-modulated read-back signal that varies continuously in accordance to a position of a head assembly relative to a track on the storage medium.

21. A storage medium, comprising:
a plurality of radially spaced apart circumferential tracks; and
at least one servo sector disposed on at least one track, the servo sector including a frequency modulation servo pattern encoded thereon, wherein the frequency modulation servo pattern is for producing a continuously varying frequency modulated read-back signal that varies proportionally to a position of a head assembly relative to a track on the storage medium, wherein the frequency modulation servo pattern comprises a plurality of contiguous magnetic domains having magnetic flux transitions at first and second boundaries, wherein the plurality of magnetic domains are in the shape of a fan having a first end and a second end, and wherein the magnetic transitions are farther apart at the first end than at the second end.

22. The storage medium of claim 21, wherein the storage medium is selected from the group consisting of a magnetic storage medium and an optical storage medium.

23. The storage medium of claim 21, wherein the frequency modulation servo pattern is an absolute frequency modulation servo pattern for producing a continuously varying absolute frequency read-back signal according to the position of the head assembly relative to the track on the storage medium.

24. The storage medium of claim 23, wherein the absolute frequency modulation servo pattern includes a plurality of elements arranged to form a fan-shaped structure.

25. The storage medium of claim 24, wherein the fan shaped structure includes a plurality of multi-sided, elements, each element having a first end and a second end, such that a distance between sides of adjacent elements are spaced farther apart at the first end than at the second end.

26. The storage medium of claim 21, wherein the frequency modulation servo pattern is a differential frequency modulation servo pattern for producing a continuously varying differential frequency read-back signal according to the position of the head assembly relative to the track on the storage medium.

27. The storage medium of claim 26, wherein the differential frequency modulation servo pattern comprises a first and second portion, the first portion comprising a first plurality of multi-sided, elements, each element having a first end and a second end, such that a distance between sides of adjacent elements of the first plurality of elements are spaced farther apart at the first end than at the second end, and the second portion comprising a second plurality of multi-sided, spaced apart elements, each element having a first end and a second, such that a distance between sides of adjacent elements of the second plurality of elements are spaced closer together at the first end than at the second end.

28. A method of forming a frequency modulation servo pattern on a storage medium, comprising:
positioning a write head over a predetermined location of the storage medium; and
incrementally moving the write head to form the frequency modulation servo pattern on the storage medium, wherein the frequency modulation pattern provides a read-back signal having a continuously varying frequency that varies proportionally to the position of a read head relative to the storage medium, wherein the frequency modulation servo pattern comprises a plurality of contiguous magnetic domains having magnetic flux transitions at first and second boundaries, wherein the plurality of magnetic domains are in the shape of a fan having a first end and a second end, and wherein the magnetic transitions are farther apart at the first end than at the second end.

29. The method of claim 28, further comprising:

repositioning the write head radially and circumferentially; and forming the frequency modulation pattern at a plurality of locations on the storage medium.

30. A method of forming a frequency modulation servo pattern, comprising pre-formatting the frequency modulation servo pattern on a storage medium by a process selected from the group consisting of FIB etching, embossing, stamping, photolithography, and electron beam lithography, wherein the frequency modulatation servo pattern provides a read-back signal having a continuously varying frequency that is proportional to the position of a read head relative to the storage medium.

* * * * *